(12) United States Patent
Aguilera et al.

(10) Patent No.: US 6,687,847 B1
(45) Date of Patent: Feb. 3, 2004

(54) FAILURE DETECTOR WITH CONSENSUS PROTOCOL

(75) Inventors: Marcos K. Aguilera, Bures-sur-Yvette (FR); Wei Chen, Nashua, NH (US); Sam Toueg, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/552,136

(22) Filed: Apr. 19, 2000

Related U.S. Application Data

(60) Provisional application No. 60/130,365, filed on Apr. 21, 1999, and provisional application No. 60/130,430, filed on Apr. 21, 1999.

(51) Int. Cl.⁷ .............................................. H02H 3/05
(52) U.S. Cl. .......................... 714/4; 714/47; 714/23; 714/15
(58) Field of Search ........................ 714/4, 47, 23, 714/11, 15

(56) References Cited

U.S. PATENT DOCUMENTS

| | | | | |
|---|---|---|---|---|
| 5,155,729 A | * | 10/1992 | Rysko et al. | 714/11 |
| 5,459,864 A | * | 10/1995 | Brent et al. | 709/105 |
| 5,799,146 A | * | 8/1998 | Badovinatz et al. | 714/11 |
| 5,883,939 A | * | 3/1999 | Friedman et al. | 714/15 |
| 5,884,018 A | * | 3/1999 | Jardine et al. | 714/11 |
| 5,938,775 A | * | 8/1999 | Damani et al. | 714/11 |
| 6,108,701 A | * | 8/2000 | Davies et al. | 709/224 |
| 6,161,198 A | * | 12/2000 | Hill et al. | 714/15 |
| 6,266,781 B1 | * | 7/2001 | Chung et al. | 714/11 |
| 6,327,675 B1 | * | 12/2001 | Burdett et al. | 714/4 |
| 6,330,689 B1 | * | 12/2001 | Jin et al. | 714/11 |
| 6,381,725 B1 | * | 4/2002 | Isokawa | 714/769 |
| 6,446,134 B1 | * | 9/2002 | Nakamura | 709/313 |
| 6,453,430 B1 | * | 9/2002 | Singh et al. | 714/47 |

\* cited by examiner

*Primary Examiner*—Scott Baderman
*Assistant Examiner*—Anne L. Damiano
(74) *Attorney, Agent, or Firm*—Jaeckle Fleischmann & Mugel, LLP

(57) ABSTRACT

New failure detector mechanisms particularly suitable for use in asynchronous distributed computing systems in which processes may crash and recover, and two crash-recovery consensus mechanisms, one requiring stable storage and the other not requiring it. Both consensus mechanisms tolerate link failures and are particularly efficient in the common runs with no failures or failure detector mistakes. Consensus is achieved in such runs within 3☐ time and with 4n messages, where ☐ is the maximum message delay and n is the number of processes in the system.

22 Claims, 8 Drawing Sheets

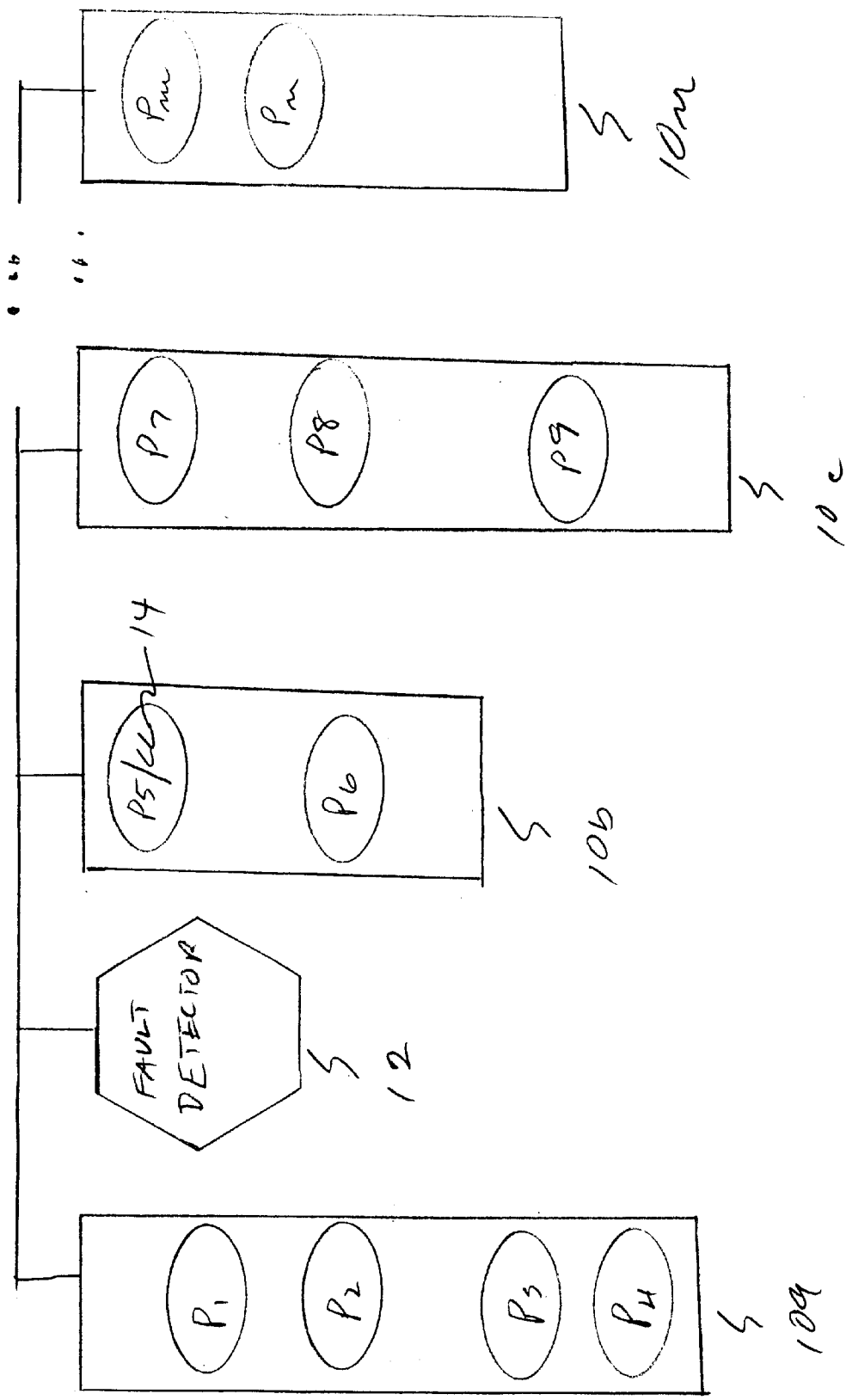

FAULT DETECTOR

| PROCESS | EPOCH # RECOV. | T-2 | T-1 | T | STATUS S |
|---|---|---|---|---|---|
| P1 | 0 | 102 | 101 | 102 | OK |
| P2 | 3 | 80 | 80 | 80 | FAILED |
| P3 | 4 | 87 | 87 | 86 | OK |
| P4 ... Pn | 50 | 92 | 92 | 93 | UNSTABLE |

PROCESS                                               COO.  VATOR

1.   P ———————→ WAKE UP ————————→ C

2.   P ←—————— NEW ROUND ←—————— C

3.   P ——————→ CURRENT ESTIMATE ——————→ C

4.                  C WAITS $(mb+1, m-mb-|R_c|)$

5.                  C CHECK FAULT DETECTOR

6.                  RESTART AT 2 IF,
                    $R_c \neq PREC\ R_c$

7.                  CONTINUE IF
                    $R_c = PREV\ R_c$

8.   P ←—————— NEW ESTIMATE ←—————— C

9.   P
     CHANGE CURRENT ESTIMATE
     TO NEW ESTIMATE

10.  P ——————→ ACK ——————→ C

11.                 C WAITS $(mb+1, m-mb-|R_c|)$

12.                 C CHECK RECOVERY

13.                 RESTART AT 8 IF
                    $R_c \neq PREV\ R_c$

14.                 CONTINUE IF
                    $R_c = PREV\ R_c$

15.  P ←—————— DECISION ←—————— C

16.  P
     ACCEPTS DECISION

FIGURE 1c

For process $p$:

1. Initialization:
2.     $R_p \leftarrow \emptyset$; $decisionvalue_p \leftarrow \bot$; for all $q \in \Pi \setminus \{p\}$ do $xmitmsg[q] \leftarrow \bot$
3. To s-send $m$ to $q$:
4.     if $q \neq p$ then $xmitmsg[q] \leftarrow m$; send $m$ to $q$ else simulate receive $m$ from $p$
5. Task *retransmit*:
6.     repeat forever
7.         for all $q \in \Pi \setminus \{p\}$ do if $xmitmsg[q] \neq \bot$ then send $xmitmsg[q]$ to $q$
8. upon receive $m$ from $q$ do
9.     if $m =$ RECOVERED then $R_p \leftarrow R_p \cup \{q\}$
10.     if $m = (decisionvalue, \text{DECIDE})$ and $decisionvalue_p = \bot$ then
11.         $decisionvalue_p \leftarrow decisionvalue$; decide($decisionvalue_p$)
12.         terminate task $\{skip\_round, 4phases, participant, coordinator, retransmit\}$
13.     if $m \neq (-, \text{DECIDE})$ and $decisionvalue_p \neq \bot$ then send $(decisionvalue_p, \text{DECIDE})$ to $q$
14. upon propose($v_p$):         {$p$ proposes $v_p$ via an external input containing $v_p$}
15.     $(r_p, estimate_p, ts_p) \leftarrow (1, v_p, 0)$; fork task $\{4phases, retransmit\}$
16. Task *4phases*:
17.     $c_p \leftarrow (r_p \mod n) + 1$; fork task $\{skip\_round, participant\}$
18.     if $p = c_p$ then fork task *coordinator*

19. Task *coordinator*:         44. Task *participant*:
20.     {Stage 1: Phase NEWROUND}         45.     {Stage 1: Phase ESTIMATE}
21.     $c\_seq_p \leftarrow 0$         46.     s-send $(r_p, \text{WAKEUP})$ to $c_p$
22.     repeat         47.     $max\_seq_p \leftarrow 0$
23.         $PrevR_p \leftarrow R_p$; $c\_seq_p \leftarrow c\_seq_p + 1$     48.     repeat
24.         s-send $(r_p, c\_seq_p, \text{NEWROUND})$ to all     49.         if received $(r_p, seq, \text{NEWROUND})$ from $c_p$
25.         wait until [ received $(r_p, c\_seq_p, estimate_q,$     50.         for some $seq > max\_seq_p$ then
26.         $ts_q, \text{ESTIMATE})$ from     51.         s-send $(r_p, seq, estimate_p, ts_p, \text{ESTIMATE})$ to $c_p$
27.         $\max(n_b + 1, n - n_b - |R_p|)$ processes ]     52.         $max\_seq_p \leftarrow seq$
28.     until $R_p = PrevR_p$     53.     until [ received $(r_p, seq, estimate_{c_p}, \text{NEWESTIMATE})$
29.     $t \leftarrow$ largest $ts_q$ such that $p$ received     54.     from $c_p$ for some $seq$ ]
30.     $(r_p, c\_seq_p, estimate_q, ts_q, \text{ESTIMATE})$     55.     if $p \neq c_p$ then
31.     $estimate_p \leftarrow$ select one $estimate_q$ such that     56.         $(estimate_p, ts_p) \leftarrow (estimate_{c_p}, r_p)$
32.     $p$ received $(r_p, c\_seq_p, estimate_q, t, \text{ESTIMATE})$
33.     $ts_p \leftarrow r_p$
34.     {Stage 2: Phase NEWESTIMATE}     57.     {Stage 2: Phase ACK}
35.     $c\_seq_p \leftarrow 0$     58.     $max\_seq_p \leftarrow 0$
36.     repeat     59.     repeat forever
37.         $PrevR_p \leftarrow R_p$; $c\_seq_p \leftarrow c\_seq_p + 1$     60.     if received $(r_p, seq, estimate_{c_p}, \text{NEWESTIMATE})$
38.         s-send $(r_p, c\_seq_p, estimate_p,$     61.     from $c_p$ for some $seq > max\_seq_p$ then
39.         NEWESTIMATE) to all     62.     s-send $(r_p, seq, \text{ACK})$ to $c_p$
40.         wait until [ received $(r_p, c\_seq_p, \text{ACK})$ from     63.     $max\_seq_p \leftarrow seq$
41.         $\max(n_b + 1, n - n_b - |R_p|)$ processes ]
42.     until $R_p = PrevR_p$
43.     s-send $(estimate_p, \text{DECIDE})$ to all 64. Task *skip_round*:
65.     $d \leftarrow \mathcal{D}_p$         {query $\Diamond S'_e$}
66.     if $c_p \in d.trustlist \setminus R_p$ then
67.         repeat $d' \leftarrow \mathcal{D}_p$         {query $\Diamond S'_e$}
68.         until [ $c_p \notin d'.trustlist \setminus R_p$ or $d.epoch[c_p] < d'.epoch[c_p]$ or received some message $(r, \ldots)$ such that $r > r_p$ ) ]
69.     terminate task $\{4phases, participant, coordinator\}$         {abort current round}
70.     repeat $d \leftarrow \mathcal{D}_p$ until $d.trustlist \setminus R_p \neq \emptyset$         {query $\Diamond S'_e$}
71.     $r_p \leftarrow$ the smallest $r > r_p$ such that $[(r \mod n) + 1] \in d.trustlist \setminus R_p$ and $r \geq \max\{r' \mid p$ received $(r', \ldots)\}$
72.     fork task *4phases*         {go to a higher round}
73. upon recovery:
74.     $decisionvalue_p \leftarrow \bot$; for all $q \in \Pi \setminus \{p\}$ do $xmitmsg[q] \leftarrow \bot$; fork task *retransmit*
75.     s-send RECOVERED to all Solving Consensus without Stable Storage using $\Diamond S'_e$ FIGURE 1d

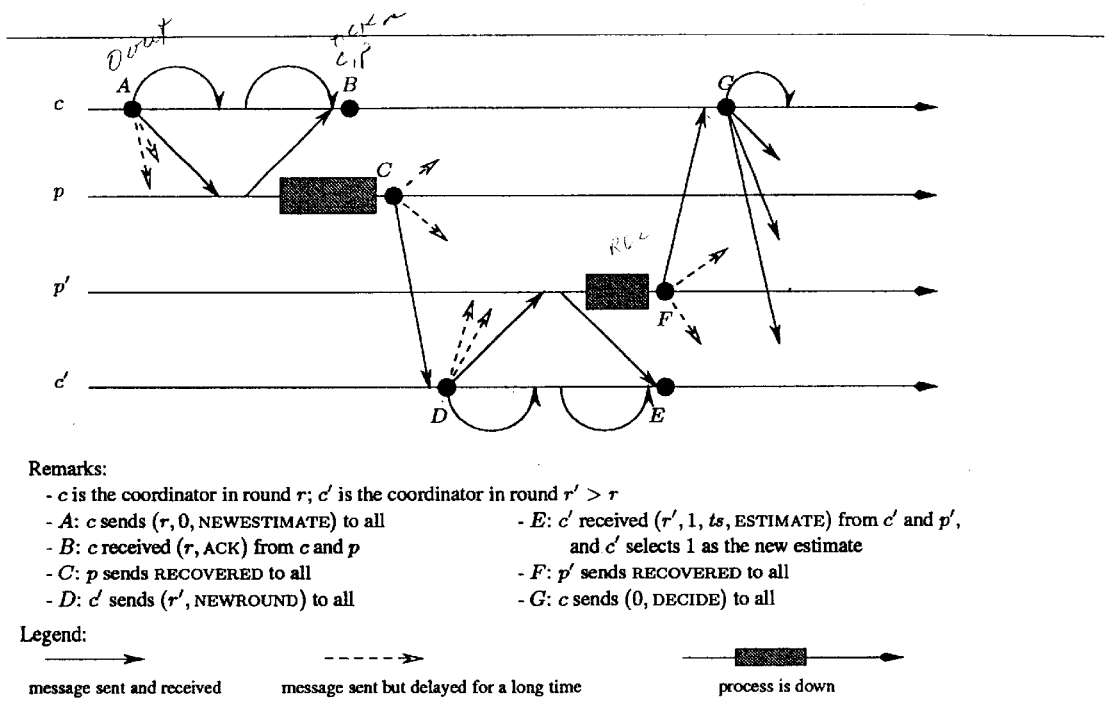

Figure 2: A bad scenario that can occur if mechanism (2) is not used.

```
1   For process p:
2     Initialization and upon recovery:
3       D'_p.trustlist ← Π
4       for all q ∈ Π do
5         D'_p.epoch[q] ← 0; epoch_p[q] ← 0; dislike_p[q] ← ∅; vec_p[q] ← ⊥
6     repeat forever
7       d_p ← D_p                                                                         {query ◊S_e}
8       send d_p to all processes
9       upon receive d_q from q do
10        for all r ∈ Π do
11          if r ∉ d_q.trustlist or (vec_p[q] ≠ ⊥ and r ∈ vec_p[q].trustlist and d_q.epoch[r] > vec_p[q].epoch[r])
12            then dislike_p[r] ← dislike_p[r] ∪ {q}
13          if |dislike_p[r]| > n/2 then
14            dislike_p[r] ← ∅
15            epoch_p[r] ← epoch_p[r] + 1
16        vec_p[q] ← d_q
17        D'_p.trustlist ← {s : |{r : vec_p[r] ≠ ⊥ and s ∉ vec_p[r].trustlist}| ≤ n/2}     {output trust list}
18        for all r ∈ D'_p.trustlist do
19          D'_p.epoch[r] ← epoch_p[r]                                                     {output epoch numbers}
```

Figure 4: Transforming $\mathcal{D} \in \Diamond \mathcal{S}_e$ into $\mathcal{D}' \in \Diamond \mathcal{S}_u$ For every process $p$:

1  Initialization:
2     for all $q \in \Pi \setminus \{p\}$ do $xmitmsg[q] \leftarrow \perp$
3  To s-send $m$ to $q$:
4     If $q \neq p$ then $xmitmsg[q] \leftarrow m$; send $m$ to $q$ else simulate receive $m$ from $p$
5  Task *retransmit*:
6     repeat forever
7       for all $q \in \Pi \setminus \{p\}$ do if $xmitmsg[q] \neq \perp$ then send $xmitmsg[q]$ to $q$
8  upon propose($v_p$):                                                                                       {$p$ proposes $v_p$ by writing it into stable storage}
9     $(r_p, estimate_p, ts_p) \leftarrow (1, v_p, 0)$
10    fork task {*4phases, retransmit*}
11 Task *4phases*:
12    store $\{r_p\}$; $c_p \leftarrow (r_p \mod n) + 1$; fork task {*skip_round, participant*}
13    if $p = c_p$ then fork task *coordinator*

14 Task *coordinator*:                                                  31 Task *participant*:
15    {Phase NEWROUND}                                             32    {Phase ESTIMATE}
16    if $ts_p \neq r_p$ then                                          33    if $ts_p \neq r_p$ then
17       s-send $(r_p, \text{NEWROUND})$ to all            34       s-send $(r_p, estimate_p, ts_p, \text{ESTIMATE})$ to $c_p$
18       wait until [ received $(r_p, estimate_q, ts_q,$       35       wait until [ received $(r_p, estimate_{c_p},$
19         ESTIMATE) from $\lceil (n+1)/2 \rceil$ processes ]    36         NEWESTIMATE) from $c_p$ ]
20       $t \leftarrow$ largest $ts_q$ such that $p$ received          37       if $p \neq c_p$ then
21         $(r_p, estimate_q, ts_q, \text{ESTIMATE})$             38         $(estimate_p, ts_p) \leftarrow (estimate_{c_p}, r_p)$
22       $estimate_p \leftarrow$ select one $estimate_q$ such that    39         store $\{estimate_p, ts_p\}$
23         $p$ received $(r_p, estimate_q, t, \text{ESTIMATE})$
24       $ts_p \leftarrow r_p$
25       store $\{estimate_p, ts_p\}$
26    {Phase NEWESTIMATE}                                   40    {Phase ACK}
27    s-send $(r_p, estimate_p, \text{NEWESTIMATE})$ to all    41    s-send $(r_p, \text{ACK})$ to $c_p$
28    wait until [ received $(r_p, \text{ACK})$ from
29       $\lceil (n+1)/2 \rceil$ processes ]
30    s-send $(estimate_p, \text{DECIDE})$ to all 42 Task *skip_round*:
43    $d \leftarrow \mathcal{D}_p$                                                                                                                           {query $\Diamond \mathcal{S}_u$}
44    if $c_p \in d.trustlist$ then
45       repeat $d' \leftarrow \mathcal{D}_p$                                                                              {query $\Diamond \mathcal{S}_u$}
46       until [ $c_p \notin d'.trustlist$ or $d.epoch[c_p] < d'.epoch[c_p]$ or received some message $(r, \ldots)$ such that $r > r_p$ ]
47    terminate task {*4phases, participant, coordinator*}                                        {abort current round}
48    repeat $d \leftarrow \mathcal{D}_p$ until $d.trustlist \neq \emptyset$                                          {query $\Diamond \mathcal{S}_u$ to go to a higher round}
49    $r_p \leftarrow$ the smallest $r > r_p$ such that $[(r \mod n) + 1] \in d.trustlist$ and $r \geq \max\{r' \mid p$ received $(r', \ldots)\}$
50    fork task *4phases*

51 upon receive $m$ from $q$ do
52    if $m = (estimate, \text{DECIDE})$ and decide($-$) has not occurred then              {check stable storage about decide}
53       decide($estimate$)                                                                                      {decide is logged into stable storage}
54       terminate task {*skip_round, 4phases, participant, coordinator, retransmit*}
55    if $m \neq (-, \text{DECIDE})$ and decide($estimate$) has occurred then                     {check stable storage about decide}
56       send $(estimate, \text{DECIDE})$ to $q$ 57 upon recovery:
58    for all $q \in \Pi \setminus \{p\}$ do $xmitmsg[q] \leftarrow \perp$
59    if propose($v_p$) has occurred and decide($-$) has not occurred then       {check stable storage about propose and decide}
60       retrieve $\{r_p, estimate_p, ts_p\}$
61       if $r_p = \perp$ then $r_p \leftarrow 1$; if $estimate_p = \perp$ then $(estimate_p, ts_p) \leftarrow (v_p, 0)$
62       fork task {*4phases, retransmit*}

Figure 3: Solving Consensus with Stable Storage using $\Diamond \mathcal{S}_u$

For process $p$:

1  Initialization:
2     $r_p \leftarrow 0; R_p \leftarrow \emptyset$
3     for all $i \in N$ do
4       $report_p[i] \leftarrow \bot; proposal_p[i] \leftarrow \bot; coord\_est_p[i] \leftarrow \bot$
5  upon propose($v_p$):                                                                                                                                                         {$p$ proposes $v_p$ via an external input containing $v_p$}
6     repeat forever
7       $r_p \leftarrow r_p + 1$
8       $c_p \leftarrow (r_p \bmod n) + 1$
9       repeat send $(r_p, v_p, \text{SUGGESTION})$ to $c_p$
10     until [ for some $w$ receive $(r_p, w, \text{ESTIMATE})$ from $c_p$ or suspect $c_p$ or epoch number of $c_p$ increases ]
11     If for some $w$ receive $(r_p, w, \text{ESTIMATE})$ from $c_p$ then $v_p \leftarrow w$
12     $report_p[r_p] \leftarrow v_p$
13     $RV_p[r_p] \leftarrow collect(\text{REPORT})$
14     If for some $w$, $RV_p[r_p] = \{w\}$ then $proposal_p[r_p] \leftarrow w$ else $proposal_p[r_p] \leftarrow ?$
15     $PV_p[r_p] \leftarrow collect(\text{PROPOSAL})$
16     If for some $w \neq ?$, $w \in PV_p[r_p]$ then $v_p \leftarrow w$
17     If for some $w \neq ?$, $PV_p[r_p] = \{w\}$ then decide($w$)
18 procedure $collect(valtype)$
19    $seq_p \leftarrow 0$
20    repeat
21     $PrevR_p \leftarrow R_p; seq_p \leftarrow seq_p + 1$
22     repeat send $(r_p, seq_p, valtype, \text{REQUEST})$ to all
23     until [ received messages of the form $(r_p, seq_p, *, valtype)$ from $\max(n_b + 1, n - n_b - |R_p|)$ processes ]
24    until $R_p = PrevR_p$
25    return({ $v$ : received $(r_p, seq_p, v, valtype)$ })
26 upon receive RECOVERED from $q$ do
27    $R_p \leftarrow R_p \cup \{q\}$
28 upon receive $(r_q, v_q, \text{SUGGESTION})$ from $q$ do
29    If $coord\_est_p[r_q] = \bot$ then $coord\_est_p[r_q] \leftarrow v_q$
30    send $(r_q, coord\_est_p[r_q], \text{ESTIMATE})$ to $q$
31 upon receive $(r_q, seq_q, \text{REPORT, REQUEST})$ from $q$ do
32    If $report_p[r_q] \neq \bot$ then send $(r_q, seq_q, report_p[r_q], \text{REPORT})$ to $q$
33 upon receive $(r_q, seq_q, \text{PROPOSAL, REQUEST})$ from $q$ do
34    If $proposal_p[r_q] \neq \bot$ then send $(r_q, seq_q, proposal_p[r_q], \text{PROPOSAL})$ to $q$
35 upon recovery:
36    for all $i \in N$ do
37     $report_p[i] \leftarrow \bot; proposal_p[i] \leftarrow \bot; coord\_est_p[i] \leftarrow \bot$
38    repeat forever
39     send RECOVERED to all Figure 5: Solving Consensus without Stable Storage using $\diamond S_c$ 1  For process $p$:
2      Initialization and upon recovery:
3          $\mathcal{D}_p.trustlist \leftarrow \Pi$; $trustlist_p \leftarrow \Pi$
4          for all $q \in \Pi$ do $\mathcal{D}_p.epoch[q] \leftarrow 0$; $epoch_p[q] \leftarrow 0$; $\Delta_p[q] \leftarrow$ default time-out interval
5          send I-RECOVERED to all processes
6      repeat forever
7          send I-AM-ALIVE to all processes
8          for all $q \in \Pi$ do
9              If $q \in trustlist_p$ and $p$ did not receive I-AM-ALIVE from $q$ during the last $\Delta_p[q]$ ticks of $p$'s clock then
10                 $trustlist_p \leftarrow trustlist_p \setminus \{q\}$                                                                        {suspect $q$}
11             $\mathcal{D}_p.trustlist \leftarrow trustlist_p$                                                              {update the failure detector output}
12         for all $q \in \mathcal{D}_p.trustlist$ do $\mathcal{D}_p.epoch[q] \leftarrow epoch_p[q]$
13     upon receive I-AM-ALIVE from $q$ do
14         If $q \notin trustlist_p$ then
15             $trustlist_p \leftarrow trustlist_p \cup \{q\}$                                                                                   {trust $q$}
16             $\Delta_p[q] \leftarrow \Delta_p[q] + 1$                                                                                    {increase timeout}
17     upon receive I-RECOVERED from $q$ do
18         $epoch_p[q] \leftarrow epoch_p[q] + 1$ Figure 6: Implementing $\Diamond \mathcal{S}_e$ and $\Diamond \mathcal{S}'_e$ in $\mathcal{M}_3$

FAILURE DETECTOR WITH CONSENSUS PROTOCOL

CROSS-REFERENCE TO RELATED APPLICATIONS

This invention is a conversion of U.S. Provisional Application Serial No. 60/130,365, filed Apr. 21, 1999 and U.S. Provisional Application Serial No. 60/130,430, filed Apr. 21, 1999. This patent incorporates by reference the disclosures found in each of the related applications identified above.

STATEMENT REGARDING FEDERALLY SPONSORED RESEARCH OR DEVELOPMENT

This invention was made with Government support from the National Science Foundation under Grant No. 9711403, Contract No. ONR N0001496-1-1014. The Government has certain rights in the invention.

FIELD OF INVENTION

This invention relates to interconnected computer systems, and more specifically to interconnected fault-tolerant computer systems which perform distributed processing.

BACKGROUND OF INVENTION

Distributed computing is the design, programming and operation of a system of interconnected computers to achieve some common goal. In a stricter sense, distributed computing allows the processes performed by a given computing platform or set of platforms in the system to be performed in one or more other platforms in a coordinated fashion without affecting the computational results obtained by the processes. Fault-tolerant distributed computing provides for such a system to compensate reliably, accurately and in a timely way, and without manual intervention, for any of a specified range of failures which may occur during the pursuit of that goal.

The successful management of faults, errors and failures in such a computing environment is complex, but it is essential for any application requiring the cooperation of multiple computers on a real-time basis, especially where the application and the system must support or protect human life. Such situations include medical diagnostic and life-support systems, aircraft fly-by-wire systems, banking, finance and stock-trading systems, and spacecraft environment control and repair systems.

Most computer applications require only a single processor and memory, storage space connected exclusively to that processor, and a link to the Internet, with only one user in control. For such systems, no fault-tolerance exists; if the system encounters a hardware fault or a software error, it will either fail the faulty component, terminate the software in error, or crash the system. As any user of a desktop computer will attest, recovery is a manual affair, and may take a long time.

By contrast, fault-tolerant systems must continue acceptable operation under failure conditions. Fault-tolerant systems require some level of hardware redundancy, keeping reserve hardware and software processing components available for use in sufficient numbers and types to handle ongoing and anticipated workload whenever an operating component fails. Since a processing component may fail, multiple processing components are designed into fault-tolerant systems to allow uninterrupted completion of work in progress. The processing components cooperate in the distribution, execution and completion of tasks, and the assembly and distribution of their results.

Failure of a processing component in a fault-tolerant distributed system does not imply that the failed component stops all processing and relinquishes its workload. Some types of failure permit reboot and recovery of the failed component, allowing it to continue with active service. Under conditions of heavy load, this reactivation of a failed component may be essential for the system to continue to deliver its outputs as required.

Unfortunately, such reactivations may not correct the problem causing the failure in the first place, and a reactivated processing component may resume its work, deliver some results, and fail again, more than once. How does the system accommodate such erratic behavior? How can the system make a valid determination as to the state of its processing components, and act accordingly to complete its work in an acceptable manner?

The same question applies whether the processing components in question are hardware components, software components, or a combination or blend of the two types. For the purposes of this discussion, a process and a processor are considered to have similar, even identical, problems of behavior. The terms "process" and "processor" are used interchangeably here.

Numerous mechanisms have been constructed in hardware and software to prevent individual component failures from stopping an entire system or rendering its processing ineffective. A critical problem with many such mechanisms is that they cannot reliably detect and identify failures of other system components. A failure message may be lost. A failure-detection component may itself malfunction. A working component may be falsely identified by malfunctioning hardware or software as one that has failed.

Consensus

The best range of solutions to the problem of reliable failure detection falls under the heading of consensus: getting the active, reliable processes in a system to agree on some common decision value, such as whether to commit or abort a transacction, whether or not a given component of the system has failed. Depending on the degree of complexity of failures the system is designed to handle, such consensus may require a high level of redundancy of processes. This requirement adds significant capital and operating cost to the system.

The problem of solving consensus in asynchronous systems with unreliable failure detectors (i.e., failure detectors that make mistakes) was first investigated in [CT96, CHT96]. These works only considered systems where process crashes are permanent and links are reliable (i.e., they do not lose messages). In real systems, however, processes may recover after crashing and links may lose messages. The problem of solving consensus with failure detectors in such systems was first considered in [DFKM96, OGS97, HMR97].

Solving consensus in a system where processes may recover after crashing raises two new problems; one regards the need for stable storage and the other concerns the failure detection requirements.

First, regarding stable storage: when a process crashes, it loses all its local state—the memory of what is going on at the time of the crash. This "memory loss" limits severely the actions a process can take upon its recovery. One way proposed for dealing with this problem is to assume that parts of the local state are recorded into stable storage, and can be restored after each recovery. But since stable storage operations are slow and expensive, they must be avoided as much as possible. Is stable storage always necessary when solving consensus? If not, under which condition(s) can it be completely avoided?

Second, regarding failure detection: in the crash-recovery model, a process may keep on crashing and recovering indefinitely. Such a process is called unstable. How should a failure detector view unstable processes? An unstable process may be as useless to an application as one that permanently crashes, and may in fact be disruptive to overall system operation. For example, an unstable process can be up just long enough to be considered operational by the failure detector, and then crash before "helping" the application; this up-down-up cycle could repeat indefinitely. It would be natural to require that a failure detector satisfy the following completeness property: Eventually every unstable process is permanently suspected.

Implementing such a failure detector is difficult even in a perfectly synchronous system—one in which the stages of operation are synchronized and timed, and expectations of completion may be set and met. The difficulty is due to the fact that, at any given point in time, no such implementation can predict the future behavior of a process that has crashed in the past but is currently "up". Will this crashed process continue to repeatedly crash and recover, or will it stop crashing?

The problem of solving consensus with failure detectors in systems where processes may recover from crashes was first addressed in [DFKM96], with crash recovery as a form of omission failure. More recently the problem was studied in [OGS97, HMR97]. In these three works, the question of whether stable storage is always necessary was not addressed, and all the algorithms used stable storage. In [DFKM96, OGS97] the entire state of the algorithm is recorded into stable storage at every state transition. In [HMR97], only a small part of the state is recorded, and writing to stable storage is done at most once per round. The algorithm in [DFKM96] is not designed to deal with unstable processes which may intermittently communicate with good ones. The algorithms in [OGS97, HMR97] use failure detectors that require that unstable processes be eventually suspected forever.

This last requirement has a serious drawback: it forces failure detector implementations to behave poorly even in perfectly synchronous systems. A good example is found in the class of synchronous, round-based systems having no message losses. A synchronous system always performs its intended function within a finite and known time bound; a round-based system uses multiple rounds of decision-making among active processes regarding other processes that are suspected of having failed. In such a system, up to a certain maximum number of processes may be unstable.

In such a system, every implementation of a failure detector with the above requirement will execute with the following undesirable behavior: there will inevitably occur a round of execution after which all processes are permanently up, but the failure detector incorrectly suspects the given maximum number of potentially-unstable processes forever. Significantly, these permanent mistakes are not due to the usual causes, namely, slow processes or message delays. They are entirely due to the requirement for suspecting unstable processes. This requirement involves predicting the future.

What are the consequences of requiring that unstable processes be suspected, meaning that they cannot be used? Consider the example of a set of processes receiving and storing telemetry data, in which certain infrequently-occurring streams of bad data can cause the receiving process to fail. In this case, the users of the data consider the receipt and storage of the data more important than the failure of a receiving process. If a prolonged burst or series of bursts of bad data is received, a failure detector obeying the above requirement may take one or more receiving processes out of service, incurring the loss of significant streams of irreplaceable information.

Clearly, if potentially-productive processes in a system are barred from performing their tasks in this manner, the system is wasting resources and possibly losing critical data. On the other hand, if faulty processes are allowed to continue operation without adequate restraint, the products of their execution may be worthless or disruptive, and the system as a whole may crash.

REFERENCES

[CHT96] Tushar Deepak Chandra, Vassos Hadzilacos, and Sam Toueg. The weakest failure detector for solving consensus. Journal of the ACM, 43(4):685–722, July 1996.

[CT96] Tushar Deepak Chandra and Sam Toueg. Unreliable failure detectors for reliable distributed systems. Journal of the ACM, 43(2):225–267, March 1996.

[DFKM96] Danny Dolev, Roy Friedman, Idit Keidar, and Dahlia Malkhi. Failure detectors in omission failure environments. Technical Report 96-1608, Department of Computer Science, Cornell University, Ithaca, N.Y., September 1996.

[HMR97] Michel Hurfin, Achour Mostefaoui, and Michel Raynal. Consensus in asynchronous systems where processes can crash and recover. Technical Report 1144, Institut de Recherche en Informatique et Systèmes Aléatoires, Université de Rennes, November 1997.

[OGS97] Rui Oliveira, Rachid Guerraoui, and Andre Schiper. Consensus in the crash-recover model. Technical Report 97-239, Département d'Informatique, École Polytechnique Fédérale, Lausanne, Switzerland, August 1997.

SUMMARY

The invention comprises a protocol to provide consensus among processes in a distributed computing system where processes may crash and later recover. The invention also provides consensus among processes which may be disconnected and later reconnected to the network, as can often happen in a mobile environment, where messages can be lost. In support of its consensus protocol, the invention further comprises the augmenting of the output of process-failure detectors with epoch numbers, one per active process, in order to detect both permanent and transient crashes. The invention's protocol does not require the use of stable storage, thereby reducing system cost and complexity, and works even if more than a majority of the processes have crashed. The invention's failure detectors and their epoch numbers permit the proper handling of failed processes that suffer from frequent transient crashes. The invention does not remove such processes from service, and thereby improves performance, reliability, stability and productivity of the system. The invention further requires no mechanism for predicting future behavior of the system in which it operates.

The invention's consensus mechanisms tolerate link failures and are particularly efficient in the runs that are most likely in practice—those with no failures or failure detector mistakes. In such runs, the invention achieves consensus within $3\delta$ time and with 4n messages, where $\delta$ is the maximum message delay and n is the number of processes in the system.

DESCRIPTION OF DRAWINGS

FIG. 1a shows a high level schematic of a multi-process computer system with a heartbeat fault detector and consensus.

FIG. 1b is a more detailed schematic diagram of the fault detector of the invention.

FIG. 1c shows a schematic diagram of consensus signals exchanged among the processes of the multi-process computer system.

FIG. 1d presents the mechanism (algorithm) for solving consensus without stable storage, using the ◆$S'_e$ failure detector (see below for the definition of ◆$S'_e$ and other failure detectors).

FIG. 2 diagrams a bad scenario that can occur during recovery processing, if the part of the locking mechanism of the invention is missing.

FIG. 3 presents the mechanism for solving consensus with stable storage, using the ◆$S_u$ failure detector (see below for the definition of ◆$S_u$).

FIG. 4 presents the mechanism for transforming a failure detector from the ◆$S'_e$ type to the ◆$S_u$ type, without requiring the addition of stable storage.

FIG. 5 presents the mechanism for solving consensus without stable storage, using the ◆$S_e$ failure detector.

FIG. 6 presents the mechanism for implementing the ◆$S_e$ and ◆$S'_e$ failure detectors in a partially-synchronous system.

DETAILED DESCRIPTION OF INVENTION

The invention comprises a mechanism to solve consensus in the crash-recovery model (with lossy links). As a crucial part of this mechanism, the invention further comprises a class of reasonable failure detectors used for this task. The invention also determines if and when stable storage is necessary.

To describe the invention in detail, some preliminary definition of the invention's environment, assumptions, context, and conventions is required. The following subsection supplies this information to establish the groundwork for the rigorous detail which follows later.

Framework

The invention operates in any of a class of asynchronous message-passing distributed systems of computers. The programs executing in such systems are here called processes. In these systems, no assumptions are made regarding the time it takes to deliver a message, or regarding relative process speeds. In these systems, every process is connected with every other process through a communication link. Links can fail by intermittently dropping messages.

A process can fail by crashing, and a crashed process may subsequently recover. When a process crashes it loses all of its state (its memory of events and context at the time of the crash). Such a process may use local stable storage, in the form of nonvolatile memory or disk space, to save (and later retrieve) parts of its state.

When a process crashes, it loses all its volatile state, but it is assumed here that when it recovers, it receives information telling it that it is recovering from a crash. Moreover, a process may use a stable storage device to store and retrieve a set of variables.

It is important to note that these two stable storage operations, storage and retrieval, cannot be executed together with certain other actions as if the combination of actions were a single uninterruptible act. For example, a process cannot store a variable in stable storage and then send a message or issue an external output, in a single step. In systems such as these, the formal term to describe a single uninterruptible act is "atomic".

With these concepts set forth, the invention's structure and workings are now presented, first by an informal expansion of the summary, and second by the complete formal definition of its workings.

Informal Detailed Description

The invention comprises a novel consensus protocol with a set of novel failure detectors. The failure detectors are presented first.

Failure Detectors

To operate properly, fault-tolerant processes in a distributed system of computers require knowledge of the state of other such processes in that system. Failure detectors in a distributed system exist in every such process in that system, and serve to supply these processes with the most accurate possible characterization of the status of the system. These failure detectors are computing mechanisms.

Unstable processes are those which repeatedly start and crash. Conventional failure detectors deal poorly with unstable processes, in that they eventually treat them as unusable by assigning them to a set of "bad" processes. The invention inverts this paradigm, by instead making possible the assigning of such unstable processes to a set of "trusted" processes, where circumstances warrant. To decide on the usefulness of an unstable process in this set, the invention also maintains an epoch number associated with the identity of each process.

Each time a process crashes and recovers, before it takes any other steps in recovery it notifies all other processes that it is recovering. Each other process, on receiving this notification, updates its information concerning the recovered process. The invention's epoch number represents the number of times the invention records a recovery for each process returning to service in the system. The invention maintains this epoch number as a part of the process recovery information. Through rigorous monitoring and analysis of the epoch number for a given process, the invention determines on a continuing basis whether or not that process can be used productively.

Where a reporting process is known to be active, an epoch number which does not change shows its receivers that the process which reported it is stable and operational. An epoch number which changes infrequently shows its receivers that the low frequency of the failures of its reporting process may well permit the continued use of that process. An epoch number which changes very often signals the receiving process that the reporting process may or may not be trusted to operate productively. The invention provides a logical mechanism to differentiate between productive and unproductive processes in this last category.

A failure detector with epoch numbers outputs: (a) the list of all the processes that it deems to be currently operational, and (b) an epoch number for each process on this list. The processes that are not on this list are those that the failure detector considers to be currently down. Such a failure detector satisfies the following completeness property. If a processor p is unstable or crashes permanently, then there is a time after which either: (a) p is not on the list of processors deemed to be operational, or (b) p's epoch number keeps increasing. A failure detector with epoch numbers can also satisfy an accuracy property about non-faulty processors, e.g., that they end up on the list of operational processors and that their associated epoch numbers stop increasing.

The invention implements the addition of epoch numbers to failure detectors in two embodiments:

Each time a processor p recovers from a crash, it sends a message announcing this recovery (it must do so before sending any other message); the failure detector counts the number of such messages received from p, and outputs this count as the epoch number of p. In this case, the epoch number of p is an estimate of the number of times p has crashed and recovered so far. This implementation does not require access to disk or any other stable storage device. Moreover, it can be made resilient to some forms of communication failures, as described below.

In the second implementation, the epoch number of p is generated by p itself when it recovers, and p includes this epoch number in the "I-am-alive" messages that it periodically sends. To generate its epoch number, p can either read the time from a local clock, or p can use a counter that it stores in stable storage.

Consensus Protocol

Decision-making in a distributed computing system requires a method whereby processes may interact to decide on some course of action. Such an action might be deciding on whether or not to include a process (perhaps unstable) in a mutually-agreed-upon set of trusted processes.

The invention comprises a protocol to solve consensus in a distributed system where processes may crash and later recover (or, processes may be disconnected and later reconnected to the network, such as it can happen in a mobile environment) and messages can be lost. The invention's protocol is the first one that does not require the use of stable storage and, at the same time, works even if more than a majority of the processes may crash. Conventional protocols require that processes store data in stable storage, such as disks, that survives crashes. The invention's protocol is useful because stable storage is not always available, and its access often incur high costs; for example, a typical disk access is orders of magnitude slower and less energy-efficient than access to main memory (energy consumption is a special concern for light-weight battery-operated portable devices, such as PDAs).

The invention's protocol is based on the "rotating coordinator" paradigm. Roughly speaking: (a) processes proceed in rounds, (b) each round has a designated coordinator that will try to impose a common decision value, (c) the coordinator will succeed if it does not crash (and it is not wrongly suspected of having crashed), and (d) processes that believe that the current coordinator has crashed start the next round, which has a different coordinator. Since different processes may receive the decision value from different coordinators, it is crucial that once a coordinator succeeds in imposing its decision value to some process, this value is "locked", i.e., all the subsequent coordinators can only impose the same decision value. This central property is achieved by a locking mechanism, which is the core of many consensus algorithms. The traditional locking mechanism requires that a coordinator interact with a majority of processes before imposing a decision value. This locking mechanism, however, does not work in systems in which a majority of processes may crash and then recover after losing all their state (this loss occurs when processes do not use stable storage). The invention's protocol uses a novel locking mechanism that works in such systems. It does not use stable storage.

The invention's protocol relies on the operation of its failure detectors to supply each process's information concerning the status of the other processes. The interactions between the failure detectors and the consensus protocol are explained in the following section.

With reference to FIG. 1a, the multi-process computer system includes a plurality of computer 10a, 10b, 10c, . . . 10n. Computer 10a includes a number of processes, p1, p2, and p3. Computer 10b includes processes p5 and p6. The process p6 is designated a coordinator 14. That selection and designation is arbitrary and is normally altered many times while the system is in operation. Computer 10c includes processes p7, p8 and p9. The computers 10n are coupled to each other and to a fault detector 12. While the detector 12 is shown as an element separate from the computers 10n, those skilled in the art understand that fault detector 12 maybe an integral part of any one of the computers 10n.

Turning to FIG. 1b, the fault detector 12 includes a list of the process pn, the number of times each process recovered from a failure, and the frequency of the recoveries. Each process emits a heartbeat detection signal that is received by the fault detector 12. Each process normally sends a heartbeat signal with a predetermined frequency. The fault detector records the received heartbeat signals from each process. If the process is normal and active, the heartbeat count steadily increases. However, if a process fails, there is a hiatus in signals and the heartbeat count fails to increase thereby indicating a failed process. When the process recovers, the heartbeat signals resume. When they resume, the process has recovered.

As shown, for example, in FIG. 1.2, p1 has had no failures and has always been up and running. Its last three heartbeat count signals are 100, 101 and 102, respectively. However, process p2 has crashed for its third time and has not yet recovered. Its last three heartbeat counts are all the same, 80. Process p3 had failed four times but is back on line and has a steady heartbeat count. Process p4 is unstable. While its heartbeat is increasing, notice that it has had 50 recoveries. In another embodiment of the invention, each process keeps a heartbeat count of all the other processes. In that way any process may act as coordinator for a consensus round.

The invention conducts a consensus procedure to identify the processes that are useable. That procedure will be summarize here and explained in more detail later. Tuning to FIG. 1c, a consensus round begins with a WAKE UP signal sent by one of the processes to the coordinator process 14. In response, coordinator 14 sends a NEW ROUND signal to all the processes. Each process in turn replies with its CURRENT ESTIMATE. That value was stored in the process during a prior consensus round. Coordinator 14 waits a sufficient time to receive the CURRENT ESTIMATE signals from the processes identified as active by the heartbeat detector 12. It could be any signal, such as the number 45. Then coordinator 14 checks the fault detector 12 to see if any new process has come back on line. If so, the round restarts. If there are no new recoveries, coordinator 14 sends an NEWESTIMATE, which could also be any number different from the CURRENT ESTIMATE, e.g. 87. Each process receives the NEWESTIMATE and changes is CURRENT ESTIMATE to the new number, 87 and sends an acknowledgment signal ACK to the coordinator 14. Coordinator 14 waits a sufficient time to receive the ACK signals from the processes identified as active by the heartbeat detector 12. Then coordinator 14 again checks the fault detector 12 to see if any new process has come back on line. If so, the ACK step restarts. After there are no new recoveries and the coordinator waits the required time, it sends its DECISION (87) to the processes where they are saved until the next round. In this way the DECISION is said to be "locked" into the processors.

Formal Definition of the Invention
Organization of Information

The detailed formal definition of the invention is organized as follows. The sections are numbered to permit easier reference from one to another:

In Basics (Section 1), how consensus is solved without stable storage.

In Model (Section 2), the general crash-recovery model is described.

In Failure Detectors for the Crash-Recovery Model (Section 3) the invention's failure detectors, namely ◆$S_e$ and ◆$S_u$, are described.

In Consensus with Crash-Recovery (Section 4), the Consensus problem is defined.

In On the Necessity of Stable Storage for Consensus (Section 5), are defined the specific conditions under which consensus requires stable storage.

In Solving Consensus without Stable Storage (Section 6) is presented a consensus algorithm which does not require stable storage.

In Solving Consensus with Stable Storage (Section 7) is presented a consensus algorithm which uses stable storage.

In Performance of the Consensus Algorithms (Section 8), the performance of these algorithms is analyzed.

In Repeated Consensus (Section 9) the issue of repeated consensus is discussed.

Transforming ◆$S_e$ into ◆$S_u$ (Section 10) demonstrates how to transform the ◆$S_e$ algorithm into the ◆$S_u$ algorithm.

Solving Consensus without Stable Storage using ◆$S_e$ (Section 11) demonstrates the invention's mechanism for accomplishing this form of consensus solution.

Implementation of ◆$S_e$ and ◆$S'_e$ in Partially Synchronous Systems (Section 12) reveals adaptations of the invention to systems having more restrictive operating requirements.

Proof of Theorem 22 (Section 13).

1 Basics

Can consensus be solved in the crash-recovery model without stable storage, and if so, how? To answer this question, assume during each execution of consensus that at least $n_a$ processes are guaranteed to remain up.

Clearly, if $n_a<1$ then consensus cannot be solved without stable storage: it is possible that all processes crash and recover during execution, and the entire state of the system (including previous proposals and possible decisions) can be lost forever. On the other hand, if $n_a>n/2$, i.e., a majority of processes are guaranteed to remain up, then solving consensus without stable storage is easy. If a process crashes it is excluded from participating in the algorithm even if it recovers (except that it is allowed to receive the decision value). This essentially reduces the problem to the case where process crashes are permanent and a majority of processes do not crash.

Is it possible to solve consensus without stable storage if $1 \leq n_a \leq n/2$? The invention takes advantage of the fact that:

If $n_a \leq n_b$ then consensus cannot be solved without stable storage even using an eventually perfect failure detector defined in Section 5, denoted ◆$\mathscr{P}$.

If $n_a>n_b$ then consensus can be solved without stable storage using ◆$S_e$ (which is weaker than ◆$\mathscr{P}$).

This last result is somewhat surprising because with $n_a>n_b$, a majority of processes may crash and completely lose their state (including the consensus values they may have previously proposed and/or decided).

To illustrate this with a concrete example, suppose n=10, $n_a=3$ and $n_b=2$. In this case, up to 7 processes—more than half of the processes—may crash and lose their state, and yet consensus is solvable with a failure detector that is weaker than ◆$\mathscr{P}$. Prima facie, this seems to contradict the fact that if a majority of processes may crash then consensus cannot be solved even with ◆$\mathscr{P}$. There is no contradiction, however, since if all process crashes are permanent, none of the crashed processes can recover to perform useful work. The invention, however, provides that some of the processes that crash do recover: even though they completely lost their state, they can still provide some help.

What if stable storage is available? The invention solves consensus with ◆$S_u$, provided that a majority of processes are good (this requirement is weaker than $n_a>n_b$). In addition to crashes and recoveries, the invention's two consensus algorithms (with and without stable storage) also tolerate message losses, provided that links are fair lossy, i.e., if p sends messages to a good process q infinitely often, then q receives messages from p infinitely often.

Overall, the invention solves the problems of failure detection and consensus in asynchronous systems with process crashes and recoveries, and lossy links.

The invention's new failure detectors avoid the drawbacks of the anomalous behavior of earlier implementations.

The invention's two consensus algorithms meet the necessary and sufficient conditions for solving consensus in the crash-recovery model, one using stable storage and the other not using it. Both algorithms tolerate message losses, and are particularly efficient in the runs that are most likely in practice—those with no failures or failure detector mistakes, and message delays are bounded. In such runs, consensus is achieved within 3δ time and with 4n messages, where δ is the maximum message delay and n is the number of processes in the system.

2 Model

The model in which the invention operates assumes asynchronous message-passing distributed systems in which there are no timing assumptions. In particular, no assumptions are made concerning the time it takes to deliver a message, or on relative process speeds. Every process is assumed to be connected with every other process through a communication link. Links can fail by intermittently dropping messages. A process can fail by crashing and it may subsequently recover. When a process crashes it loses all of its state. However, it may use local stable storage to save (and later retrieve) parts of its state.

For the purposes of this description, the existence of a discrete global clock is assumed. This is merely a fictional device to simplify the presentation and processes do not have access to it. The range T of the clock's ticks is assumed to be the set of natural numbers.

2.1 Processes and Process Failures

The system consists of a set of n processes, $\Pi=\{1, 2, \ldots, n\}$. Processes can crash and may subsequently recover. A failure pattern F is a function from T to $2^\Pi$. Intuitively, F(t) denotes the set of processes that are not functioning at time t. Process p is up at time t (in F) if $p \notin F(t)$ and p is down at time t (in F) if $p \in F(t)$. Process p crashes at time t if p is up at time t−1 and p is down at time t. Process p recovers at time $t \geq 1$ if p is down at time t−1 and p is up at time t. Process p crashes at time t=0 if p is down at time 0. A process p can be classified (according to F) as always-up, eventually-up, eventually-down and unstable as follows:

Always-up: Process p never crashes.
Eventually-up: Process p crashes at least once, but there is a time after which p is permanently up.
Eventually-down: There is a time after which process p is permanently down.
Unstable: Process p crashes and recovers infinitely many times.

A process is good (in F) if it is either always-up or eventually-up. A process is bad (in F) if it is not good (it is either eventually-down or unstable). The terms good (F), bad (F) and unstable(F) denote the set of good, bad and unstable processes in F, respectively. In this discussion, only failure patterns with at least one good process are considered.

2.2 Failure Detectors

Each process has access to a local failure detector module that provides (possibly incorrect) information about the failure pattern that occurs in an execution. A process can query its local failure detector module at any time. A failure detector history H with range $\mathcal{R}$ is a function from $\Pi \times T$ to $\mathcal{R}$. H(p, t) is the output value of the failure detector module of process p at time t. A failure detector $\mathcal{D}$ is a function that maps each failure pattern F to a set of failure detector histories with range $\mathcal{R}_\mathcal{D}$ (where $\mathcal{R}_\mathcal{D}$ denotes the range of the failure detector output of $\mathcal{D}$). $\mathcal{D}$(F) denotes the set of possible failure detector histories permitted by $\mathcal{D}$ for the failure pattern F.

2.3 Stable Storage

When a process crashes, it loses all its volatile state, but the invention assumes that when it recovers, it knows that it is recovering from a crash. Moreover, a process may use a stable storage device to store and retrieve a set of variables. These two stable storage operations cannot be executed atomically with certain other actions. For example, a process cannot store a variable in stable storage and then send a message or issue an external output, in a single atomic step. The actions that a process can execute in an atomic step are detailed in the next section.

2.4 Runs of Algorithms

An algorithm A is a collection of n deterministic automata, one for each process in the system. Computation proceeds in atomic steps of A. There are two types of steps: a crash step and a normal step. In a crash step, the state of a process is changed to a specially designated state called the crash state (thus the process "loses its state"). In a normal step, a process:

First executes one of the following actions, according to its state: (a) store a set of variables into local stable storage, (b) retrieve a set of variables from local stable storage, (c) send a message to some process, or (d) issue an external output. (Note that a process cannot both access the stable storage and send a message (or issue an external output) in the same atomic step.)

Then it attempts to execute each one of the following actions: (a) receive a message from a process, (b) get an external input, and (c) query its failure detector;

Finally, it changes state.

An initial configuration of algorithm A consists of the initial state of the automaton for each process. A run of algorithm A using failure detector $\mathcal{D}$ is a tuple R=(F, $H_\mathcal{D}$, I, S, T) where F is a failure pattern, $H_\mathcal{D} \in \mathcal{D}$(F) is a history of failure detector $\mathcal{D}$ for failure pattern F, I is an initial configuration of A, S is an infinite sequence of steps of A, and T is an infinite list of non-decreasing time values indicating when each step in S occurs.

A run must satisfy the following properties: (1) a process takes at most one step at each time t; (2) a process takes a normal step at time t only if it is up at t; (3) a process takes a crash step at time t if and only if it crashes at t; (4) a good process takes an infinite number of normal steps; (5) if a process p takes a step at time t and queries its failure detector, then it obtains $H_\mathcal{D}$(p, t) as a response; (6) when a process retrieves a variable from stable storage, it obtains the last value that it stored for that variable (or $\perp$ if it never stored the variable).

2.5 Link Properties

The invention considers links that do not create messages, or duplicate messages infinitely often. More precisely, each run R=(F, $H_\mathcal{D}$, I, S, T) must satisfy the following "link properties". For all processes p and q:

No Creation: If q receives a message m from p at time t, then p sent m to q before time t.

Finite Duplication: If p sends a message m to q only a finite number of times, then q receives m from p only a finite number of times.

Links may intermittently drop messages, but they must satisfy the following fairness property:

Fair Loss: If p sends messages to a good process q an infinite number of times, then q receives messages from p an infinite number of times.

2.6 Environments and Problem Solving

The correctness of an algorithm may depend on certain assumptions on the "environment", e.g., the maximum number of processes that may be bad. For example, a consensus algorithm may need the assumption that a majority of processes is good. Formally, an environment $\mathcal{E}$ is a set of failure patterns.

A problem P is defined by properties that sets of runs must satisfy. An algorithm A solves problem P using a failure detector $\mathcal{D}$ environment $\mathcal{E}$ if the set of all runs R=(F, $H_\mathcal{D}$, I, S, T) of A using $\mathcal{D}$ where $F \in \mathcal{E}$ satisfies the properties required by P.

Let $\mathcal{C}$ be a class of failure detectors. An algorithm A solves a problem P using $\mathcal{C}$ in environment $\mathcal{E}$ if for all $\mathcal{D} \in \mathcal{C}$, A solves P using $\mathcal{D}$ in $\mathcal{E}$. An algorithm implements $\mathcal{C}$ in environment $\mathcal{E}$ if it implements some $\mathcal{D} \in \mathcal{C}$ in $\mathcal{E}$.

3 Failure Detectors for the Crash-Recovery Model

To explain the invention's failure detectors, the failure detectors that were previously proposed for solving consensus in the crash-recovery model are described, and then the invention's new type of failure detector for this model is defined.

3.1 Limitations of Existing Failure Detectors

To solve consensus in the crash-recovery model, traditional approaches assume that processes have failure detectors that output lists of processes suspected to be bad, and that these failure detectors satisfy the following property:

Strong Completeness: Eventually every bad process is permanently suspected by all good processes.

Since bad processes include unstable ones, enforcing this requirement is problematic even in synchronous systems. Consider a system S in which processes take steps at perfectly synchronized rounds. In each round, a process is either up, in which case it sends a message to every process, or down, in which case it does nothing in the round. In S at most $n_u$ process are unstable, i.e., alternate between being up and down infinitely often. Links do not lose messages, and all messages sent in a round are received at the end of that round. In system S, it is trivial to implement a failure detector that is almost perfect: by suspecting every process from which no message was received in the current round, each process suspects exactly every process that was down in this round.

(In the round-model S, a failure pattern indicates for each round which processes are up and which ones are down; a process crashes in round k, if it is up in round k−1 and down in round k; a process recovers in round k, if it is down in round k−1 and up in round k.)

In S a failure detector may be implemented that satisfies Strong Completeness (and possibly only this property). The following theorem makes clear that any such implementation has undesirable behaviors: in some executions where all processes are good, some of them will eventually be suspected forever. Note that these mistakes are entirely due to the above requirement on unstable processes, not to the lack of synchrony.

Theorem 1

Let I be any implementation of a failure detector that satisfies Strong Completeness in S. For every set of processes G of size at most $n_u$, there is a run of I in S such that (a) all processes are good, but (b) eventually all processes in G are permanently suspected by all processes in Π\G.

A sketch of the proof of Theorem 1 follows. Note that in the round-model of execution, the only "non-determinism" is due to possible process failures and the times at which they occur. Thus, for each failure pattern F, there is only one run of I in S, denoted by R(F). A G-crash failure pattern is a failure pattern in which only processes in G crash. The proof of Theorem 1 follows immediately from the next lemma:

Lemma 2

For every set G of size at most $n_u$, there is a G-crash failure pattern prefix P such that the following holds. For every G-crash extension F of P in which all processes in G crash and recover at least one more time, in run R(F) eventually all processes in G are permanently suspected by all processes in Π\G.

Proof

Let G be any set of size $|G| \leq n_u$. Assume by contradiction that for every G-crash failure pattern prefix P, there exists a G-crash extension F of P in which all processes in G crash and recover at least one more time, such that in run $R(F_i)$ there is some process $p_i \in \Pi \setminus G$ that trusts some process $p' \in G$ infinitely often.

Now construct inductively an increasing sequence $\{P_i\}$ of failure pattern prefixes. Let $P_0$ be the failure pattern prefix of length 0. Given $P_i$, by assumption one can find a G-crash extension $F_i$ in which all processes in G crash and recover at least one more time, such that in run $R(F_i)$ there is some process $p_i \in \Pi \setminus G$ that trusts some process $p' \in G$ infinitely often. Let $t_i$ be the length of $P_i$ and let $t_{i+1} > t_i$ be some time such that between times $t_i$ and $t_{i+1}$ in $R(F_i)$: (1) each process in G crashes and recovers at least once and (2) $p_i$ trusts $p'_i$ at least once. Define $P_{i+1}$ to be the prefix of $F_i$ of length $t_{i+1}$.

Define $P := \lim_{i \to \infty} P_i$. Then in R(P), every process in G crashes an infinite number of times, no process in Π\G crashes, and some process in Π\G trusts some process in G an infinite number of times. This violates the Strong Completeness property of I.□

3.2 Failure Detectors with Epoch Numbers

Theorem 1 shows that if Strong Completeness is required then incorrect suspicions are inevitable even in synchronous systems. Although many algorithms are designed to tolerate such failure detector mistakes, the erroneous suspicions of some good processes may hurt the performance of these algorithms. For example, the erroneous suspicions of good coordinators can delay the termination of traditional consensus algorithms. Thus, requiring Strong Completeness should be avoided if possible.

In this section is proposed a new type of failure detectors that are well-suited to the crash-recovery model: Although they do not require unstable processes to be eventually suspected forever, they do provide enough information to cope with unstable processes.

At each process p, the output of such a failure detector consists of two items, <trustlist, epoch>, where trustlist is a set of processes and epoch is a vector of integers indexed by the elements of trustlist. Intuitively, $q \in$ trustlist if p believes that q is currently up, and epoch [q] is p's rough estimate of how many times q crashed and recovered so far (it is called the epoch number of q at p). Let H(p, t) denote the output of p's failure detector module at time t. If $q \in$ H(p, t).trustlist, one says that p trusts q at time t, otherwise one says that p suspects q at time t.

Define $\blacklozenge S_e$ to be the class of failure detectors $\mathcal{D}$ that satisfy the following properties:

Monotonicity: At every good process, eventually the epoch numbers are nondecreasing. More precisely:

$\forall F, \forall H \in \mathcal{D}(F), \forall g \in$ good $(F)$, $\forall p \in \Pi, \exists T \in T, \forall t, t' > T$:

$[p \in H(g, t).\text{trustlist} \wedge p \in$ $H(g, t').\text{trustlist} \wedge t' \models$ $H(g, t).\text{epoch}[p] \leq H(g, t').\text{epoch}[p]$ (Monotonicity of epoch numbers must hold only eventually so that the failure detector can be implemented without stable storage.)

Completeness: For every bad process b and for every good process g, either eventually g permanently suspects b or b's epoch number at g is unbounded. More precisely:

$\forall F, \forall H \in \mathcal{D}(F), \forall b \in$ bad $(F), \forall g \in$ good $(F):[\exists T \in T, \forall t > T,$
$b \notin H(g, t).\text{trustlist}]$ $\vee [\forall M \in N, \exists t \in T, b \in H(g, t).\text{trustlist} \wedge H(g, t).\text{epoch}[b] > M]$ Accuracy: For some good process K and for every good process g, eventually g permanently trusts K and K's epoch number at g stops changing. More precisely:

$\forall F, \forall H \in \mathcal{D}(F), \exists K \in$ good $(F), \forall g \in$ good $(F), \exists M \in N, \exists T \in T,$
$\forall t > T : K \in H(g, t).\text{trustlist} \wedge H(g, t).\text{epoch}[K] = M$ A simple implementation of $\blacklozenge S_e$ for some models of partial synchrony is given in Section 12. This implementation does not have the limitations associated with Strong Completeness. Moreover, it does not use stable storage.

Note that $\blacklozenge S_e$ imposes requirements only on the failure detector modules of good processes. In particular, the accuracy property of $\blacklozenge S_e$ allows unstable processes to suspect all good processes. This is problematic because unstable processes can continue to take steps, and their incorrect suspicions may hinder the progress of some algorithms. Thus, the accuracy property is extended so that it also applies to unstable processes, as follows:

Strong Accuracy: For some good process K: (a) for every good process g, eventually g permanently trusts K and K's epoch number at g stops changing; and (b) for every unstable process u, eventually whenever u is up, u trusts K and K's epoch number at u stops changing. More precisely:

$\forall F, \forall H \in \mathcal{D}(F), \exists K \in \text{good } (F):[\forall p \in \text{good}(F),$ $\exists M \in N, \exists T \in T, \forall t > T,$ $K \in H(p, t).\text{trustlist} \wedge H(p,t).\text{epoch } [K]=M] \wedge$ $[\forall u \in \text{unstable}(F), \exists M \in N, \exists T \in T,$ $\forall t > T, u \notin F(t) \Rightarrow$ $K \in H(u, t).\text{trustlist}$ $\wedge H(u, t).\text{epoch } [K]=M]$ The class of failure detectors that satisfy Monotonicity, Completeness, and Strong Accuracy is denoted ◆$S_u$. For convenience, ◆$S_e$ or ◆$S_u$ may be used to refer to an arbitrary member of the corresponding class. ◆$S_e$ and ◆$S_u$ are closely related: In Section 10 is shown that one can transform ◆$S_e$ into ◆$S_u$ provided that a majority of processes are good (this transformation does not require stable storage).

4 Consensus with Crash-Recovery

In the consensus problem, each process proposes a value and processes must reach a unanimous and irrevocable decision on one of the proposed values. The following properties must be satisfied:

Uniform Validity: If a process decides v then some process previously proposed v.

Agreement: Good processes do not decide different values.

Termination: If all good processes propose a value, then they all eventually decide.

A stronger version of consensus, called uniform consensus, requires:

Uniform Agreement: Processes do not decide different values.

The algorithms of the invention solve uniform consensus, and the lower bounds proved for the invention hold even for consensus.

When processes have access to stable storage, a process proposes v, or decides v, by writing v into corresponding local stable storage locations. By checking these locations, a process that recovers from a crash can determine whether it previously proposed (or decided) a value.

When processes do not have access to stable storage, proposing and deciding v occur via an external input and output containing v, and so when a process recovers it cannot determine whether it has previously proposed or decided a value. Thus it is clear that if stable storage is not available and all processes may crash and recover, consensus cannot be solved. In many systems, however, it is reasonable to assume that in each execution of consensus there is a minimum number of processes that do not crash. In such systems, consensus is solvable without stable storage provided certain conditions are met, as is shown in the next section.

5 On the Necessity of Stable Storage for Consensus

In this section are determined some necessary conditions for solving consensus without stable storage. Consider a system in which at least $n_a$ processes are always-up and at most $n_b$ are bad. The first result is that if $n_a \leq n_b$ then it is impossible to solve consensus without stable storage, even in systems where there are no unstable processes, links are reliable, and processes can use an eventually perfect failure detector ◆$\mathcal{P}$.

Informally, for the crash-recovery model, ◆$\mathcal{P}$ outputs a tag ∈{AU, EU, UN, ED} for each process such that:

There is a time after which at each process the tag of every process p is AU, EU, UN, or ED iff p is always-up, eventually-up, unstable, or eventually-down, respectively.

Note that ◆$\mathcal{P}$ is stronger than the other failure detectors in this paper and.

Theorem 3

If $n_a \leq n_b$, consensus cannot be solved without stable storage even in systems where there are no unstable processes, links do not lose messages, and processes can use ◆$\mathcal{P}$.

This result is tight in the sense that if $n_a > n_b$ then consensus can be solved without stable storage using a failure detector that is weaker than ◆$\mathcal{P}$ (see Section 6).

The impossibility result of Theorem 3 assumes that processes do not use any stable storage at all. Thus, if a process crashes it cannot "remember" its previous proposal and/or decision value. Suppose stable storage is available, but to minimize the cost of accessing it, it is used only for storing (and retrieving) the proposed and decision values. Is $n_a > n_b$ still necessary to solve consensus? It turns out that if $n_b > 2$, the answer is yes:

Theorem 4

Suppose that each process can use stable storage only for storing and retrieving its proposed and decision values. If $n_a \leq n_b$ and $n_b > 2$ then consensus cannot be solved even in systems where there are no unstable processes, links do not lose messages, and processes can use ◆$\mathcal{P}$.

Proofs of Theorems 3 and 4 follow. Since these theorems have similar proofs, a detailed proof is offered only for Theorem 4, with an outline for the proof of Theorem 3.

To prove Theorem 4, consider a system with $n_a \leq n_b$, $n_b > 2$, and such that links do not lose messages. Assume for a contradiction that there is a consensus algorithm $\mathcal{A}$ that (1) uses stable storage only for storing and retrieving its proposed and decision values; and (2) uses failure detector ◆$\mathcal{P}$. Henceforth, in all runs of $\mathcal{A}$ considered, processes always propose a value in {0, 1} at the beginning of the run.

Definition 1

Let R be a set of runs of $\mathcal{A}$. By the properties of consensus, in every run in R, all good process eventually decides the same value. One says that R is 0-valent (resp. 1-valent) if in every run in R, the good processes decide 0 (resp. 1). One says that R is bivalent if R is neither 0-valent nor 1-valent, i.e., R has a run in which the good processes decide 0 and a run in which the good processes decide 1.

In the next definitions, let V be an assignment of proposed values, one for each process, and $G_{au}$ and $G_{bad}$ be disjoint subsets of size $n_b$ of processes.

Definition 2

R(V, $G_{bad}$) is defined to be the set of runs of $\mathcal{A}$ such that (1) the value proposed by each process is given by V; (2) processes in $G_{bad}$ crash at the beginning and never recover; and (3) processes not in $G_{bad}$ never crash.

Note that in any run in R(V, $G_{bad}$), processes in $G_{bad}$ are bad, and the other processes are always-up.

Definition 3

R(V, $G_{au}$, $G_{bad}$) is defined to be the set of runs of $\mathcal{A}$ such that (1) the value proposed by each process is given by V; (2) processes in $G_{bad}$ crash at the beginning and never recover; (3) processes in $G_{au}$ never crash; and (4) processes not in $G_{au} \cup G_{bad}$ crash at the beginning, recover right afterwards, and never crash again.

Note that in any run in R(V, $G_{au}$, $G_{bad}$), processes in $G_{au}$ are always-up (This is possible because $|G_{au}|=n_b \geq n_a$.), processes in $G_{bad}$ are bad, and the other processes are eventually-up.

Lemma 5

There exists V and disjoint subsets of processes G and G' of size $n_b$ such that (1) in some run $r \in R(V, G)$, the first good process to decide is in G'; (2) in some run $r' \in R(V, G, G')$, the decision value of the good processes is different from the decision value of the good processes in r.

Proof

There are two cases. For the first case, assume that there is V and a set G of size $n_b$ such that $R(V, G)$ is bivalent. Then, for i=0, 1 one can find a run $r_i$ in $R(V, G)$ in which good processes decide i. Let $p_i$ be the first good process to decide in $r_i$ and let G' be any subset of size $n_b$ that is disjoint from G and contains $p_0$ and $p_1$. Let r' be any run in $R(V, G, G')$. If good processes in r' decide 0, let $r:=r_1$; else let $r:=r_0$. Then clearly r and r' satisfy conditions (1) and (2) of the lemma.

For the other case, assume that for every $\underline{V}$ and every set $\underline{G}$ of size $n_b$, $R(\underline{V}, \underline{G})$ is either 0-valent or 1-valent. Let $G=\{n-n_b+1, \ldots, n\}$. For i=0, 1, ..., n, let $V_i$ be the assignment of proposed values such that the proposed value for processes 1, 2, ..., i is 1, and for processes i+1, ..., n, it is 0. Then clearly $R(V_0, G)$ is 0-valent. Moreover, for any run in $R(V_{n-nb}, G)$, all processes that ever take any steps propose 1, so $R(V_{n-nb}, G)$ is 1-valent. Therefore, for some $j \in \{0, \ldots, n-n_b-1\}$ it is true that $R(V_j, G)$ is 0-valent and $R(V_{j+1}, G)$ is 1-valent.

Let $r_0 \in R(V_j, G)$ and $r_1 \in R(V_{j+1}, G)$. Note that good processes in $r_0$ decide 0, and in $r_1$ good processes decide 1. For i=0, 1, let $p_i$ be the first good process to decide in $r_i$ and let G' be any subset of size $n_b$ that is disjoint from G and contains $p_0$, $p_1$ and j+1. Note that the only difference between $V_j$ and $V_{j+1}$ is the proposed value of process j+1. Moreover, j+1∈G', so that process j+1 never takes any steps in any runs in $R(V_j, G, G')$ or in $R(V_{j+1}, G, G')$. Therefore, $R(V_j, G, G')=R(V_{j+1}, G, G')$. Let $r' \in R(V_j, G, G')$. If good processes in r' decide 0, let $r:=r_1$ and $V:=V_{j+1}$; otherwise, let $r:=r_0$ and $V:=V_j$. Then clearly r and r' satisfy conditions (1) and (2) of the lemma.□

Proof of Theorem 4 (Sketch)

Let V, G, G', r and r' be as in Lemma 5. Let p (resp. p') be the first good process to decide in r (resp. r'), let t (resp. t') be the time when this decision happens and let v(resp. v') be the decision value. Then v≠v' and p∈ G'. One now constructs a new run r" of $\mathcal{A}$ as follows. The proposed value of processes is given by V. Initially processes in G do not take any steps and processes in Π\G behave as in run r. This goes on until time t (when p decides v). Messages sent and not received by time t are delayed until after time t+t'+1. At time t+1, all processes in G' stop taking steps, and processes not in G∪G' crash. At time t+2, processes not in G∪G' recover. Note that at time t+2, the state of all processes not in G' are as in run r' at time 1. From time t+2 to time t+t'+1, processes not in G' behave as in run r' from time 1 to t'. Thus, at time t+t'+1, process p' decides v'. After time t+t'+1, (1) all processes take steps in a round-robin fashion, (2) all messages ever sent are received, (3) the failure detector behaves perfectly, i.e., at every process the tag of processes in G∪G' is AU and the tag of processes not in G∪G' is EU.

Note that r" is a run of in which all processes are good. Moreover, p decides v and p' decides v'=v. This violates the agreement property of consensus.□

Here is an outline of the proof of Theorem 3. Let $n_a \leq n_b$. If $n_b=0$ then $n_a=0$ and it is easy to see that there can be no consensus algorithm (since all processes may lose their proposed values by crashing at the beginning). So let $n_b>0$. Assume for a contradiction that there is a consensus algorithm that does not use stable storage (and uses ◆𝒫).

Lemma 6

There exists V and disjoint subsets of processes G and G' of size $n_b$ such that the decision value of good processes in some run $r \in R(V, G)$ is different from the decision value of good processes in some run $r' \in R(V, G, G')$.

Proof

The proof is similar to the proof of Lemma 5.□

The rest of the proof of Theorem 3 uses Lemma 6 and otherwise is similar to the proof of Theorem 4.

6 Solving Consensus without Stable Storage

It turns out that if $n_a>n_b$, consensus can be solved without stable storage using ◆$S_e$. This is somewhat surprising since $n_a>n_b$ allows a majority of processes to crash (and thus lose all their states). Note that the requirement of $n_a>n_b$ is "tight": in the previous section, it was proved that if $n_a \leq n_b$ consensus cannot be solved without stable storage even with ◆𝒫, a failure detector that is stronger than ◆$S_e$.

The consensus algorithm that uses ◆$S_e$ is given in Section 11. In this section is presented a more efficient algorithm that uses a minor variant of ◆$S_e$, denoted ◆$S'_e$. The only difference between ◆$S_e$ and ◆$S'_e$ is that while the accuracy property of ◆$S_e$ requires that K be a good process (see Section 3.2), the accuracy property of ◆$S'_e$ additionally requires that K be an always-up process if such a process exists. It is worth noting that the implementation of ◆$S_e$ in Section 12 also implements ◆$S'_e$.

The invention's consensus algorithm given here always satisfies the Uniform Agreement and Validity properties of uniform consensus, and if the number of processes that are always up is more than $n_b$, then it also satisfy the Termination property.

This algorithm, shown in FIG. 1, is based on the rotating coordinator paradigm, and uses ◆$S'_e$. It must deal with unstable processes and link failures. More importantly, since more than half of the processes may crash and completely lose their states, and then recover, it must use new mechanisms to ensure the "locking" of the decision value (so that successive coordinators do not decide differently).

The standard technique for locking a value is to ensure that a majority of processes "adopt" that value. This will not work here: a majority of processes may crash and recover, and so all the processes that adopted a value may later forget the value they adopted.

The following paragraphs explain how the algorithm deals with unstable processes and link failures, and then describe the algorithm and the new mechanisms for locking the decision value.

How does a rotating coordinator algorithm cope with an unstable coordinator? In traditional mechanisms the burden is entirely on the failure detector: it is postulated that every unstable process is eventually suspected forever. In the invention, the failure detector is not required to suspect unstable processes: they can be trusted as long as their epoch number increases from time to time—a requirement that is easy to enforce. If the epoch number of the current coordinator increases at a process, this process simply abandons this coordinator and goes to another one.

To deal with the message loss problem, each process p has a task retransmit that periodically retransmits the last message sent to each process (only the last message really matters, just as in traditional mechanisms). This task is terminated once p decides.

The algorithm is now described in more detail. When a process recovers from a crash, it stops participating in the algorithm, except that it periodically broadcasts a RECOVERED message until it receives the decision value. When a process p receives a RECOVERED message from q, it adds q to a set R p of processes known to have recovered.

Processes proceed in asynchronous rounds, each one consisting of two stages. In the first stage, processes send a WAKEUP message to the coordinator c so that c can start the current round (if it has not done so yet). The coordinator c broadcasts a NEWROUND message to announce a new round, and each process sends its current estimate of the decision value—together with a timestamp indicating in which round it was obtained—to c. Then c waits for estimates from $\max(n_b+1, n-n_b-|R_c|)$ processes—this is the maximum number of estimates that c can wait for without fear of blocking forever, because more than $n_b$ processes are always-up and respond, and at most $n_b+|R_c|$ processes have crashed and do not respond. Then c checks whether during the collection of estimates it detected the recovery of a process that never recovered before ($R_c \neq PrevR_c$). If so, c restarts the first stage from scratch. (An obvious optimization is for c to check during the collection of estimates whether $R_c \neq PrevR_c$. If so it can restart the first stage right away.) Otherwise, c chooses the estimate with the largest timestamp as its new estimate and proceeds to the second stage.

In the second stage, c broadcasts its new estimate; when a process receives this estimate, it changes its own estimate and sends an ACK to c. Process c waits for ACK messages from $\max(n_b+1, n-n_b-|R_c|)$ processes. As before, c restarts this stage from scratch if during the collection of ACKs it detected the recovery of a process that never recovered before ($R_c \neq Prev R_c$). Finally. c broadbroadcasts its esimate as the decision value and decides accordingly. Once a process decides, it enters a passive state in which, upon receipt of a message, the process responds with the decision value.

A round r can be interrupted by task skip_round (which runs in parallel with tasks coordinator and participant): a process p aborts its execution of round r if (1) it suspects the coordinator c of round r, or (2) it trusts c but detects an increase in the epoch number of c, or (3) it detects a recovery of c, or (4) it receives a message from a round r'>r. When p aborts round r, it jumps to the lowest round r'>r such that (1) p trusts the coordinator c' of round r', (2) p has not detected a recovery of c'($c' \notin R_p$) and (3) p has not (yet) received any message with a round number higher than r'.

The code in lines 31–33 is executed atomically, i.e., it cannot be interrupted, except by a crash. As an obvious optimization, the coordinator of round 1 can skip phase NEWROUND and simply set its estimate to its own proposed value. This optimization is omitted from the code.

The correctness of the algorithm relies on the following crucial property: if the coordinator sends a decision for v in some round, then value v has previously been "locked", i.e., in any later round, a coordinator can only choose v as its new estimate. This property is ensured by two mechanisms: (1) the coordinator uses $\max(n_b+1, n-n_b-|R_p|)$ as a threshold to collect estimates and ACKs, and (2) the coordinator restarts the collection of estimates and ACKs from scratch if it detects a new recovery ($R_c = PrevR_c$).

The importance of mechanism (2) is illustrated in FIG. 2: it shows a bad scenario (a violation of the crucial property above) that could occur if this mechanism is omitted. The system consists of four processes $\{c, p, p', c'\}$. Assume that $n_b=1$ and there are at least $n_a=2$ processes that are always up. At point A, the coordinator c of round r sends its estimate 0 to all, and at B, it receives ACKs from itself and p. At F, p' recovers from a crash and sends a RECOVERED message to all. At G, c has received one RECOVERED message from p' (so $|R_c|=1$) and two ACKs. Since $\max(n_b+1, n-n_b-|R_c|)=2$, c completes its collection of ACKs (this is the maximum number of ACKs that c can wait for without fear of blocking), and c sends a decision for 0 to all in round r. Meanwhile, at C, p recovers from a crash and sends a RECOVERED message to all, and c' receives this message before D. At D, c' becomes the coordinator of round r'>r and sends a NEWROUND message to all. At E, c' has received two estimates for 1, one from itself and one from p'. Since it has also received one RECOVERED message from p, c' completes its collection of estimates, and chooses 1 as its new estimate for round r'—even though c sends a decision for 0 in an earlier round.

The proof of the algorithm shows that mechanism (2) prevents this and other similar bad scenarios. In this example, if c had used mechanism (2), then at G it would have restarted the collection of ACKs from scratch because $PrevR_c=0 \neq \{p'\}=R_c$. (It is not sufficient to use the restarting mechanism only for collecting ACKs: a symmetric example shows that this mechanism must also be used for collecting estimates.)

Theorem 7

The algorithm of FIG. 1 satisfies the Uniform Validity and Uniform Agreement properties of uniform consensus. If at most $n_b$ processes are bad, and more than $n_b$ processes are always up, then it also satisfies the Termination property.

The proof follows.

Definition 4

One says that p is in round r at time t if p does not crash by time t and the value of variable $r_p$ at time t is r. A process p starts round r when p assigns r to variable $r_p$.

Lemma 8 (Uniform Validity)

If a process decides v then some process previously proposed v.

Proof

Trivial.□

Lemma 9

Suppose that in some round r the coordinator c s-sends (est, DECIDE) in line 43. In every round $r' \geq r$, if the coordinator c' selects a new estimate value est' in line 31, then est=est'.

Proof

The proof is by induction on the round number r'. The claim trivially holds for r'=r. Now assume that the claim holds for all $r', r \leq r' < k$. Let c' be the coordinator of round k. It will be shown here that the claim holds for r'=k, i.e., if c' selects a new estimate value est' in line 31 in round k, then est'=est. Since c s-sends (est, DECIDE) in line 43 in round r, c executes the wait statement in line 40 only finitely often in round r. Similarly, since c' executes line 31 in round k, c' executes the wait statement in line 25 only finitely often in round k. Thus the following definitions are valid:

$seq_A$, the value of $c\_seq_c$ just after c executes the wait statement in line 40 for the last time in round r.

A, the subset of processes from which c has received (r, $seq_A$, ACK) by the time c exits the wait statement in line 40 for the last time in round r.

$R_A$, the value of set $R_c$ just after c executes the wait statement in line 40 for the last time in round r.

$seq_E$, the value of $c\_seq_{c'}$ just after c' executes the wait statement in line 25 for the last time in round k.

E, the subset of processes from which c' has received messages of the form (k, $seq_E$, *, *, ESTIMATE) by the time c' exits the wait statement in line 25 for the last time in round k.

$R_E$, the value of set $R_{c'}$ just after c' executes the wait statement in line 25 for the last time in round k.

The invention's claim is that (1) processes in $R_A$ crash before c starts s-sending (r, $seq_A$, est, NEWESTIMATE) to any process in round r (line 38). Indeed, just after c executes line 40 for the last time in round r, $R_A = R_c$ (by the definition of $R_A$) and $R_c = PrevR_c$ (by the condition in line 42). Therefore, $PrevR_c = R_A$. But all processes in $PrevR_c$ crashed before c starts s-sending (r, $seq_A$, est, NEWESTIMATE). So the claim follows.

Note that (2) $|A| \geq n_b + 1$ (this is due to the guard in line 40). It is now shown that $A \cap R_A = \emptyset$. By the previous claim, if a process $p \in R_A$ then p crashes before c starts s-sending (r, $seq_A$, est, NEWESTIMATE), which happens before any process s-sends (r, $seq_A$, ACK) to c. So p crashes before any process s-sends (r, $seq_A$, ACK) to c. Since after a process crashes (and recovers) it can s-send only RECOVERED or DECIDE messages, it follows that $p \notin A$. Thus, $A \cap R_A = \emptyset$.

So, $|A \cup R_A| = |A| + |R_A|$. By the threshold used to collect ACKs in lines 40–41, $|A| \geq \max(n_b+1, n-n_b-|R_A|)$, and thus (3) $|A \cap R_A| \geq n - n_b$.

By analogous arguments it can be shown that (4) $|E| \geq n_b + 1$ and (5) $|E \cup R_E| \geq n - n_b$.

It is now shown that $E \cap A \neq \emptyset$. Suppose, for contradiction, that $E \cap A = \emptyset$. By (3) and (4), it is apparent that $E \cap (A \cup R_A) \neq \emptyset$. Since $E \cap A = \emptyset$, it is apparent that $E \cap R_A \neq \emptyset$. Let $p \in E \cap R_A$. Clearly, c' starts s-sending (k, $seq_E$, NEWROUND) to processes before p receives such a message, which happens before p s-sends a message of the form (k, $seq_E$, \*, \*, ESTIMATE) to c' (p s-sends such a message because $p \in E$), which happens before p crashes (since after a process crashes and recovers, it can s-send only RECOVERED or DECIDE messages), which happens before c starts s-sending (r, $seq_A$, est, NEWESTIMATE) to processes (this follows from the fact that $p \in R_A$ and claim (1)). From all this, one can conclude that c' starts s-sending (k, $seq_E$, NEWROUND) before c starts s-sending (r, $seq_A$, est, NEWESTIMATE).

By (2) and (5), $A \cap (E \cup R_E) \neq \emptyset$. By an argument analogous to the above one, one can conclude that c starts s-sending (r, $seq_A$, est, NEWESTIMATE) before c' starts s-sending (k, $seq_E$, NEWROUND). This is a contradiction. Hence, it is concluded that $E \cap A \neq \emptyset$.

Let $p \in E \cap A$. By the definition of A, p s-sends (r, $seq_A$, ACK) to c in round r. Before doing so, p updates $ts_p$ to r (line 33 or 56). By the definition of E, for some est" and ts", p s-sends (k, $seq_E$, est", ts", ESTIMATE) to c' in line 51 in round k. Since k>r and the value of $ts_p$ is nondecreasing, then ts"$\geq$r. Moreover, it is easy to see that c' does not receive any messages of the form (k, \*, \*, ts, ESTIMATE) with ts$\geq$k. So, the timestamp t that c' selects in line 29 in round k is such that r$\geq$t<k. Let q be the process whose estimate value est' is selected in line 31 in round k. Then in round k, q s-sends (k, $seq_E$, est', t, ESTIMATE). The invention's assertion is that in round t, q updates estimate q to est' in line 31 or 56. Indeed, in round t, q updates $estimate_q$ to some value est'" and q updates $ts_q$ to t. After that, q does not change $estimate_q$ and $ts_q$ before round k (because otherwise in round k, $ts_q$ would be different from t and q would not s-send (k, $seq_E$, est', t, estimate)). Therefore est'=est'".

Since q updates $estimate_q$ to est' in round t (line 31 or 56), it is easy to see that the coordinator of round t selects est' as the new estimate value in line 31. By the induction hypothesis, then est'=est. This shows the induction step.□

Lemma 10

If processes c and c' s-send (est, DECIDE) and (est', DECIDE) in line 43 in rounds r and r', respectively, then est=est'.

Proof

Assume without loss of generality that r'$\geq$r. Since line 43 is executed only by the coordinator, c and c' are the coordinators of rounds r and r', respectively. Since c' s-sends (est', DECIDE) in line 43 in round r', c' selects est' in line 31. By Lemma 9, est=est'.□

Lemma 11 (Uniform Agreement)

No two processes decide differently.

Proof

Suppose that processes p and p' decide on values est and est', respectively. Process p decides est in line 11 after receiving message (est, DECIDE). By a simple induction, some process must have s-sent message (est, DECIDE) in line 43. Similarly, process p' decides est' in line 11, and so some process must have s-sent message (est', DECIDE) in line 43. By Lemma 10, est=est'.□

Lemma 12

A process can start only finitely many rounds.

Proof

In order to obtain a contradiction, suppose that there are processes that start infinitely many rounds. Let P be the set of all such processes. P contains only always-up processes, since a process that crashes does not start any rounds ever again (even if it recovers). For any process $p \in P$ and any round r$\geq$1, p eventually starts a round higher than r. Let $r_p^+$ be the lowest round higher than r that p starts and let $r_p^-$ be the highest round lower than or equal to r that p starts. Then $1 \leq r_p^- \leq r < r_p^+$.

By the accuracy property of $\blacklozenge S'_e$, one can find a time T and an always-up process K such that after T, K is never suspected by any good process and the epoch number of K at every good process stops changing.

Let r be a round such that (1) K is the coordinator of round r, and (2) no process in Π\P starts a round higher than r, and (3) for every $p \in P$, p starts round $r_p^-$ after time T. Such a round clearly exists because processes in Π\P start only finitely many rounds and processes in p start infinitely many rounds.

Let p be the first process to start a round higher than r. By (2), $p \in P$ and by the definition of $r_p^-$ and $r_p^+$, p selects round $r_p^+$ when it executes line 71 in round $r_p^-$. This implies that $r_p^- = r$: indeed, if $r_p^- < r$ then p does not select round $r_p^+$ in line 71; instead, it selects a round number that is at most r since (a) p trusts the coordinator K of round r (by (3) and the definitions of T and K), and (b) K $\notin R_p$ (since K is always-up), and (c) p does not receive any messages of a round higher than r (since p is the first process to start a round higher than r). So $r_p^- = r$. By (3), p starts round r after time T. By (1) and the definition of T and K, while p is in round r, condition K$\in$d.trustlist\\$R_p$ in line 66 evaluates to true and condition (K $\notin$ d'.trustlist\\$R_p$ or d.epoch[K] <d'.epoch[K]) in line 68 always evaluates to false. Since p starts a round higher than r, it does not loop forever in lines 67–68. So p eventually receives a message of a round higher than r while in round r. This contradicts the fact that p is the first process to start a round higher than r.□

Definition 5

One says that an always-up process p blocks in round r if p starts round r but p does not start a higher round, and p never decides.

Lemma 13

If an always-up process p blocks in round r, then in this round its skip_round task loops forever in lines 67–68.

Proof

Clearly, while process p is in round r, its task skip_round must loop forever in lines 67–68 or in line 70 (otherwise p starts a round higher than r). By the Accuracy property of $\blacklozenge S'_e$, p eventually trusts some always-up process c forever. Moreover c$\notin R_p$ since c never crashes. So p cannot loop forever in line 70. Therefore p loops forever in lines 67–68.
□

Lemma 14

Suppose an always-up process p proposes but never decides. If p receives a message of round r, then eventually p starts some round $r' \geq r$.

Proof

In order to obtain a contradiction, suppose that p never starts any round $r' \geq r$. Since p proposes, p starts some round (namely, round 1). Since p does not decide, p blocks in some round r"<r. By Lemma 13, while in round r" the skip_round task of p loops forever in lines 67–68. Since p receives a message of round r, p eventually exits the loop in lines 67–68—a contradiction.□

Definition 6

One says that an eventually-up process stabilizes at time t if it recovers at time t and does not crash afterwards. By convention, one says that an always-up process stabilizes at time 0.

Lemma 15

Let p and q be two good processes. If (1) p s-sends m to q after p stabilizes, (2) m is the last message p s-sends to q, and (3) p does not decide after p stabilizes, then q receives m from p infinitely often.

Proof

By (1), (2) and (3), p sends m to q infinitely often in task retransmit (line 7). By the Fair Loss property of links, q receives messages from p infinitely often. Note that m is the only message that p sends to q infinitely often: this is because (1) in task retransmit, p eventually sends no message different from m to q, and (2) outside task retransmit, p can only send messages of the form (*, DECIDE) (line 13); however, such messages are sent only finitely often since p does not decide after p stabilizes. Therefore, by the No Creation and Finite Duplication properties of links, q receives from p only finitely many messages different from m. Since q receives messages from p infinitely often, it follows that q receives m from p infinitely often.□

Lemma 16

Suppose p and q are good processes. If p decides after p stabilizes and p receives non-DECIDE messages from q an infinite number of times, then eventually q decides after q stabilizes.

Proof

After p stabilizes and decides, every time p receives a non-DECIDE message from q, p sends a DECIDE message to q (line 13). Therefore p sends DECIDE messages to q infinitely often. Moreover, this is the only message that p sends to q infinitely often (since after p decides, it terminates all tasks). By the link properties, this implies that q receives DECIDE messages from p infinitely often. Thus, eventually q decides after q stabilizes.□

Lemma 17

If an always-up process p blocks in a round r, then the coordinator c of this round is also an always-up process. Moreover, if $p \neq c$ then c receives messages of round r from p infinitely often.

Proof

Note that if p=c then the lemma holds trivially. So assume that $p \neq c$. One first proves that c is a good process. In order to obtain a contradiction, suppose that c is bad. By the Completeness and Monotonicity properties of $\diamond S'_e$, eventually either c is suspected by p forever, or the epoch number of c at p is nondecreasing and unbounded. Therefore, in round r, p eventually exits the loop in lines 67–68. This contradicts Lemma 13. So c is a good process.

It is now claimed that c receives messages of round r from p infinitely often. To show the claim, first note that in round r, p s-sends at least one message (r, wakeup) to C. If p s-sends only finitely many messages in round r, then let m be the last message p s-sends to c. By Lemma 15, c receives this message from p infinitely often and this shows the claim. If p s-sends infinitely many messages in round r, then p sends infinitely many messages of round r to c. Moreover, p sends only finitely many messages that are not of round r: this is because (1) in task retransmit, p eventually sends only messages of round r, and (2) outside task retransmit, p can only send messages of the form (*, DECIDE), and such messages are never sent since p never decides. By the link properties, this implies that c receives messages of round r from p infinitely often. This shows the claim.

It is now proved that c is an always-up process. In order to obtain a contradiction, suppose that c is an eventually-up process. If c decides after c stabilizes then by Lemma 16 p eventually decides, and this contradicts the assumption that p blocks in round r. So c does not decide after c stabilizes. Then c s-sends a RECOVERED message top after c stabilizes, and this is the last message c s-sends to p. By Lemma 15, p eventually receives this message and adds c to r p. So eventually condition $c \notin d'.trustlist \backslash R_p$ in line 68 is true. Therefore, in round r, p's skip_round task cannot loop forever in lines 67–68. This contradicts Lemma 13. Hence c is an always-up process.□

Lemma 18

If the coordinator c of round r is always-up and blocks in round r, then c waits forever at line 25 or 40.

Proof

Since c is the coordinator of round r and c blocks in round r, c loops forever in lines 22–28 or 36–42, because otherwise q s-sends a DECIDE message to itself (line 43) and then decides (line 11). Since set $R_c$ is finite and c never removes any process from $R_c$, eventually condition $R_c = PrevR_c$ in lines 28 or 42 is always true. Therefore, c waits forever at line 25 or 40.□

Lemma 19

Suppose every always-up process proposes. If some good process p decides after p stabilizes, then eventually every good process q decides after q stabilizes.

Proof

In order to obtain a contradiction, suppose that every always-up process proposes and some good process p decides after p stabilizes, but there is some good process q that does not decide after q stabilizes. Let Q be the set of good processes q such that q does not decide after q stabilizes.

It is first claimed that Q contains only always-up processes. In order to obtain a contradiction, suppose that $q \in Q$ for some eventually-up process q. Then after q stabilizes, q s-sends a RECOVERED message to all processes, and in particular to process p. This is the last message q s-sends to p. By Lemma 15, p receives RECOVERED messages from q infinitely often. By Lemma 16, q eventually decides after q stabilizes. This contradicts the assumption that $q \in q$. So q contains only always-up processes. By Lemma 12, for every $q \in q$, q can start only finitely many rounds. Since q proposes, q blocks in some round $r_q$. Let $r = \max\{r_q | q \in Q\}$, and let $q \in Q$ be a process that blocks in round r.

Case 1: q is the coordinator of round r. By Lemma 18, q waits forever at line 25 or 40. Before q waits forever, it s-sends a non-DECIDE message to p (line 24 or 38). By Lemma 15, p receives this message infinitely often. By Lemma 16, q eventually decides after q stabilizes. This contradicts the fact that $q \in q$.

Case 2: q is not the coordinator of round r. Let $c \neq q$ be the coordinator of round r. By Lemma 17, c is an always-up process and c receives messages of round r from q infinitely often. If c decides after c stabilizes, then by Lemma 16, q decides after q stabilizes and this contradicts the fact that q ∈ q. So c does not decide after c stabilizes. Since c is always-up, c never decides. By Lemma 14, eventually c starts a round r'≧r. Since q ∈ q, by the definition of r, it is clear that have that r'≦r. Thus r'=r and so c blocks in round r. By Case 1, c eventually decides—a contradiction.□

Henceforth, assume that at most $n_b$ processes are bad, and more than $n_b$ processes are always up.

Lemma 20

If every always-up process proposes a value, then eventually some always-up process decides.

Proof

In order to obtain a contradiction, suppose that no always-up process decides. By Lemma 12, every always-up process p can start only finitely many rounds. Since p proposes, p blocks in some round r p. Let r=max{$r_p$|p is always-up} and let p be an always-up process that blocks in round r.

Case 1: p is the coordinator of round r. By Lemma 18, p waits forever at line 25 or 40.

Case 1.1: p waits forever at line 25. Let seq be the value of $c\_seq_p$ when p waits forever at line 25.

It is first shown that first show that for every always-up process q, eventually p receives (r, seq, $estimate_q$, $ts_q$, ESTIMATE) from q. Process p s-sends (r, seq, NEWROUND) to q (line 24) before p waits forever at line 25.

It is now claimed that q receives this message from p and q eventually starts round r. Indeed, if q=p, then p receives this message from itself (line 4) and p starts round r by definition. If q≠p, then (r, seq, NEWROUND) is the last message p s-sends to q. By Lemma 15, q eventually receives this message. By Lemma 14, q eventually starts a round r'≧r. By the definition of r, it is clear that r'≦r. Thus r'=r and so q starts round r.

Process q cannot receive a NEWESTIMATE message of round r from p, because p waits forever at line 25 and never s-sends NEWESTIMATE messages. So the guard in line 53 is always false. Thus q loops forever in lines 48–53. Since eventually q receives (r, seq, NEWROUND) from p and seq>0 is the largest value of variable $c\_seq_p$ in round r, eventually q s-sends (r, seq, $estimate_q$, $ts_q$, ESTIMATE) to p (line 51) and sets $max\_seq_q$ to seq (line 52). It is now claimed that p eventually receives this message from q. Indeed, if q=p, then p receives this message from itself (line 4). If q≠p, then (r, seq, $estimate_q$, $ts_q$, ESTIMATE) is the last message q s-sends to p. By Lemma 15, p eventually receives this message from q. Therefore for every always-up process q, eventually p receives (r, seq, $estimate_q$, $ts_q$, ESTIMATE) from q.

Since there are more than $n_b$ processes that are always up, eventually p receives (r, seq, $estimate_q$, $ts_q$, ESTIMATE) from at least $n_b$+1 processes. Moreover, for every eventually-up process q, q does not decide after q stabilizes, otherwise by Lemma 19 every always-up process decides. After q stabilizes, q s-sends a RECOVERED message to all (line 75). By Lemma 15, p eventually receives this message from q. When p receives this message from q, p adds q to set $R_p$ (line 9). So eventually $R_p$ contains all eventually-up processes. Since at most $n_b$ processes are bad, eventually the number of always-up processes is at least n−$n_b$−|$R_B$|. Therefore, eventually p receives (r, seq, $estimate_q$, $ts_q$, ESTIMATE) from at least n−$n_b$−|$R_B$| processes. Hence the guard in line 25 is true forever, and p cannot wait forever at line 25—a contradiction.

Case 1.2: p waits forever at line 40. Let seq be the value of $c\_seq_p$ when p waits forever at line 40.

By an argument analogous to the one in Case 1.1, it can be first shown that can show that: (1) for every always-up process q, p receives (r, seq, ACK) from q; (2) eventually $R_p$ contains all eventually-up processes. Therefore, since at most $n_b$ processes are bad, and more than $n_b$ processes are always up, p receives (r, seq, ACK) from max($n_b$+1, n−$n_b$−|$R_p$|) processes. Hence p cannot wait forever at line 40—a contradiction.

Case 2: p is not the coordinator of round r. Let c≠p be the coordinator of round r. By Lemma 17, c is an always-up process and c receives messages of round r from p infinitely often. By Lemma 14, c eventually starts a round r'≧r. By the definition of r, it is clear that r'≦r. Thus r'=r and so c blocks in round r. In Case 1, it was shown that the coordinator of round r does not block in round r—a contradiction.□

Corollary 21 (Termination)

If all good processes propose a value, then they all eventually decide. In fact, it is clear that the following stronger property holds: if all always-up processes propose, then every good process decides after it stabilizes.

Proof. By Lemmata 19 and 20.□

Proof of Theorem 7. Immediate from Lemmata 8 and, and Corollary 21.□

7 Solving Consensus with Stable Storage

A consensus algorithm is now presented that uses stable storage and ◆$S_u$. It requires a majority of good processes and works in systems with lossy links.

The basic structure of the algorithm (given in FIG. 3) consists of rounds of 4 phases each (task 4phases). In each round r, initially the coordinator c broadcasts a NEWROUND message to announce a new round, and each process sends its current estimate of the decision value— together with a timestamp indicating in which round it was obtained—to c; c waits until it obtains estimates from a majority of processes; it selects one with the largest timestamp and sends it to all processes; every process that receives this new estimate updates its estimate and timestamp accordingly, and sends an acknowledgment to c; when c receives this acknowledgment from a majority of processes, it sends its estimate as the decision to all processes and then it decides. Once a process decides, it stops tasks 4 phases and retransmit, and enters a passive state in which, upon receipt of a message, the process responds with the decision value.

A round r can be interrupted by task skip_round (which runs in parallel with tasks coordinator and participant): a process p aborts its execution of round r if (1) it suspects the coordinator c of round r, or (2) it trusts c but detects an increase in the epoch number of c, or (3) it receives a message from a round r'>r. When p aborts round r, it jumps to the lowest round r'>r such that p trusts the coordinator of round r' and p has not (yet) received any message with a round number higher than r'.

In each round, a process p accesses the stable storage twice: first to store the current round number, and later to store the new estimate and its corresponding timestamp. Upon recovery, p reads the stable storage to restore its round number, estimate, and timestamp, and then restarts task 4phases with these values.

Note that in round 1, the coordinator c can simply set its estimate to its own proposed value and skip the phase used to select a new estimate (Phase NEWROUND). It is also easy to see that the coordinator does not have to store its round number in stable storage in this case. These obvious optimizations from the code are omitted.

The following regions of code are executed atomically: lines 22–25 and 38–39.

Theorem 22

The algorithm of FIG. 3 satisfies the Uniform Validity and Uniform Agreement properties of uniform consensus. If a majority of processes are good then it also satisfies the Termination property.

The proof of this theorem has a similar structure as the proof of Theorem 7, and is given in Section 13.

8 Performance of the Consensus Algorithms 8.1 Time and Message Complexity in Nice Runs In most executions of consensus in practice, no process crashes or recovers, no message is lost, the failure detector does not make mistakes, and message delay is bounded by some known δ (including the message processing times). In such "nice" executions, the invention's two algorithms (with and without stable storage) achieve consensus within 3δ. (This is with the round 1 optimization in which the coordinator chooses its own estimate and sends it without waiting for estimates from other processes.) It takes one δ for the coordinator to broadcast NEWESTIMATE messages, one δ for processes to respond with ACKs, and another δ for the coordinator to broadcast DECIDE messages. By adding appropriate delays in the retransmit task, so that a message is retransmitted only 2δ time units after it is sent, processes send a total of 4(n−1) messages; in the first algorithm, there are n−1 messages for each of the types WAKEUP, NEWESTIMATE, ACK, and DECIDE; in the second algorithm, there are n−1 messages for each of WAKEUP, NEWESTIMATE, ACK, and DECIDE. In contrast, in nice executions the consensus algorithms of reach decision within 2δ and with $O(n^2)$ messages.

8.2 Quiescence

An algorithm is quiescent if eventually all processes stop sending messages. It is clear that no consensus algorithm can be quiescent in the presence of unstable processes (each time such a process recovers, it must be sent the decision value, at which point it may crash again and lose this message; this scenario can be repeated infinitely often). If no process is unstable, the invention's consensus algorithms are quiescent despite process crashes and message losses (provided all good processes propose a value).

9 Repeated Consensus

In Sections 6 and 7, and Section 11 are presented algorithms that solve a single instance of consensus. This is appropriate for settings where for each instance of consensus, a distinct set of processes is created to execute it (for example, an application may spawn a new set of processes for each consensus that it wants to do). In other settings, it is necessary for the same set of processes to execute repeated (and concurrent) instances of consensus. The following paragraphs describe how to modify the invention's algorithms to handle this case.

To separate the multiple instances of consensus, each instance must have a unique identifier, and all proposals, decisions, and messages associated with a particular instance of consensus are tagged with the corresponding identifier. This is the only change necessary for the consensus algorithm that uses stable storage (shown in FIG. 3 in Section 7).

For the algorithms that do not use stable storage (FIG. 1 in Section 6 and FIG. 5 in Section 11), one can also apply the above modification, except that RECOVERED messages are not tagged with instance identifiers (such messages cannot be tagged since a process that recovers has lost all its state). In principle, this modification still works, but in this case the resulting algorithms are not practical because of the following reasons.

A process that recovers from a crash stops participating in all subsequent instances of consensus. For a long-lived application this is impractical, since every process is likely to crash and recover at least once during the life of the application, and so eventually no process will remain to run new instances of consensus. Moreover, when a process recovers from a crash, it repeatedly sends a RECOVERED message to get the decision values that it may have "missed" while it was down. When a process receives such a message, it replies with all the decision values that it knows—this is also impractical.

To solve the above problems, assume that stable storage is available, but each process uses it only to store its proposals and decisions (processes do not use it to store any intermediate state, and so, by Theorem 4, solving consensus still requires that $n_a > n_b$). When a process recovers from a crash, it first checks its stable storage to determine which instances of consensus it was executing when it crashed, i.e., the instances for which it proposed a value but did not yet decide. Then, for each such instance I, it sends a RECOVERED message tagged with I, and stops participating in I. With such messages, each process p can now maintain a set $R^I_p$ of processes that it knows to have crashed and recovered while executing instance I, and it uses $R^I_p$ instead of $R_p$. $R^I_p$ is initialized to the empty set when p proposes a value for instance I, and is updated every time p receives a RECOVERED message tagged with I. Finally, if a process receives a RECOVERED message tagged with I and knows the decision value of instance I, then it replies with this decision value.

With these modifications, a process that crashes and recovers can participate in subsequent instances of consensus. Moreover, the algorithm no longer requires that at least $n_b + 1$ processes be always up throughout the lifetime of the system. Instead, it is sufficient that for each instance I of consensus, at least $n_b + 1$ processes remain up from the time they propose a value for I (to the time they all decide).

10 Transforming ◆$S_e$ into ◆$S_u$

FIG. 4 shows an algorithm to transform $\mathcal{D} \in$ ◆$S_e$ to $\mathcal{D} \in$ ◆$S_u$. This transformation works in any asynchronous system with crash and recoveries, provided a majority of processes are good. It does not require any stable storage. (A transformation algorithm T $\mathcal{D} \rightarrow \mathcal{D}'$ uses failure detector $\mathcal{D}$ to maintain at each process p a variable $\mathcal{D}'_p$ that emulates the output of $\mathcal{D}'$ at p.)

The core ideas of the algorithm are now explained. Recall that the output of $\mathcal{D}'$ consists of a trustlist, and epoch numbers for each process on that list. The algorithm maintains the trustlist s of $\mathcal{D}'$ as follows. At each process p, initially and every time p recovers, the trustlist of p includes all processes. Process p removes a process from its $\mathcal{D}'$-trustlist only if it finds out that a majority of processes $\mathcal{D}$-suspect this process. With this scheme, if a process k is $\mathcal{D}$-trusted by all the good processes, then k will be $\mathcal{D}'$-trusted by p—even if p is unstable—as required by $\mathcal{D}' \in$ ◆$S_u$.

How does p maintain an epoch number for each process in its $\mathcal{D}'$-trustlist? A naive approach would be for p to increment the $\mathcal{D}'$-epoch number of a process q every time p finds out that the $\mathcal{D}$-epoch number of q has increased at a majority of processes. This does not work because, with $\mathcal{D}$ it is possible to have an unstable process u such that (1) there is no majority that $\mathcal{D}$-suspects u and (2) there is no majority that $\mathcal{D}$-trusts u and increments its epoch number. With the naive approach, p would $\mathcal{D}'$-trust u and the epoch number of u at p would stop changing—a violation of the completeness property of $\mathcal{D}' \in \blacklozenge S_u$. To overcome this problem, p increases the epoch number of a process q if it finds out that the number of processes that "dislike" q is a majority; a process dislikes q if it suspects q or trusts q but increases its epoch number.

Theorem 23

If a majority of processes are good, then the algorithm in FIG. 4 transforms $\blacklozenge S_e$ to $\blacklozenge S_u$.

To prove this theorem, first assume that a majority of processes are good. Throughout the proofs, let k be some process such that eventually: (1) k is permanently $\mathcal{D}$-trusted by all good processes and (2) the $\mathcal{D}$-epoch number of k at each good process stops changing.

Lemma 24 (Monotonicity)

At every good process, eventually the $\mathcal{D}'$-epoch numbers are nondecreasing.

Proof

Clear because, after a good process p stabilizes, for every process q, epoch p[q] can only be incremented.□

Lemma 25

For every good process g, eventually g permanently $\mathcal{D}'$-trusts k.

Proof

Suppose for a contradiction that g $\mathcal{D}'$-suspects k infinitely often. Good processes send messages to g infinitely often, so by the Fair Loss property of links, g receives messages from good processes infinitely often. Thus, g executes line 17 infinitely often as well. When g executes line 17, it $\mathcal{D}'$-suspects k precisely if there is a majority of processes q such that $vec_g[q] \neq \bot$ and $K \notin vec_g[q]$.trustlist. Since there is a majority of good processes, every time that g executes line 17 and $\mathcal{D}'$-suspects k, there is some good process q such that $k \notin vec_g[q]$.trustlist. Thus, for some good process q, $k \notin vec_g[q]$.trustlist holds infinitely often.

Since q is good, eventually K is permanently $\mathcal{D}$-trusted by q. Then, by the No Creation and Finite Duplication properties of links, eventually g receives no message $d_q$ from q with $K \notin d_q$.trustlist. Since g receives an infinite number of messages from q, eventually $k \in vec_g[q]$.trustlist holds forever—a contradiction.□

Lemma 26

For every unstable process u, eventually whenever u is up, $\mathcal{D}'$-trusts K.

Proof

Suppose for a contradiction that u $\mathcal{D}'$-suspects K infinitely often. Every time u recovers, u sets $\mathcal{D}'_p$.trustlist to Π, and so since u $\mathcal{D}'$-suspects K infinitely often, it must execute line 17 infinitely often as well. When u executes line 17, it $\mathcal{D}'$-suspects K precisely if there is a majority of processes q such that $vec_u[q] \neq \bot$ and $K \notin vec_u[q]$.trustlist. Since there is a majority of good processes, every time that u executes line 17 and $\mathcal{D}'$-suspects K, there is some good process q such that $vec_u[q] \neq \bot$ and $K \notin vec_g[q]$.trustlist. Thus, for some good process q, (1) $vec_u[q] \neq \bot$ and (2) $K \notin vec_u[q]$.trustlist hold infinitely often.

When u recovers, it sets $vec_u[q]$ to $\bot$ and, since (1) holds infinitely often, u must set $vec_u[q]$ to a non-$\bot$ value infinitely often. So u receives messages from q infinitely often. Since q is good, eventually K is permanently $\mathcal{D}$-trusted by q. Then, by the No Creation and Finite Duplication properties of links, eventually u receives no message d from q with $K \notin d$.trustlist. Since u receives messages from q infinitely often, eventually $K \in vec_u[q]$.trustlist holds forever. This contradicts the fact that (2) holds infinitely often.□

Lemma 27

For every good or unstable process p, eventually K's epoch number at p stops changing.

Proof

Suppose for a contradiction that K's epoch number at p never stops changing. Then p increments $epoch_p[K]$ in line 15 infinitely often. So, $|dislike_p[K]| > n/2$ holds infinitely often, and $dislike_p[K]$ is reset to ∅ infinitely often. This implies that there exists a majority M of processes such that for every q ∈ M, p infinitely often receives a value $d_q$ from q such that either (1) $k \notin d_q$.trustlist or (2) ($vec_p[q] \neq \bot$ and $k \in vec_p[q]$.trustlist and $d_q$.epoch[K] > $vec_p[q]$.epoch[K]). Since a majority of processes is good, there exists a good process q ∈ M. By the No Creation and Finite Duplication properties of the links, q infinitely often sends a value $d_q$ such that either (1) or (2) holds. This implies that either q $\mathcal{D}$-suspects K infinitely often or the $\mathcal{D}$-epoch number of K at q increases infinitely often. Since q is a good process, this contradicts the definition of K.□

Henceforth, let b be a fixed bad process. The Completeness and Monotonicity properties of $\blacklozenge S_e$ guarantees that for each good process g either (1) eventually g permanently $\mathcal{D}$-suspects b; or (2) eventually the $\mathcal{D}$-epoch number of b at g is nondecreasing and unbounded.

Lemma 28

For all good processes p and q, line 11 evaluates to true infinitely often for r=b.

Proof

First note that line 11 is executed an infinite number of times since p receives messages from q infinitely often (this follows from the Fair Loss property of links). Suppose that condition $b \notin d_q$.trustlist does not hold infinitely often. Then eventually $b \in d_q$.trustlist holds forever. So, eventually all failure detector values that p receives from q contain b in its trustlist. Since p eventually stops crashing, eventually conditions $vec_p[q] \neq \bot$ and $b \in vec_p[q]$.trustlist are always true. Moreover, by the No Creation and Finite Duplication properties of links, q infinitely often sends failure detector values containing b in its trustlist. Therefore q $\mathcal{D}$-trusts b infinitely often. By the Completeness and Monotonicity properties of $\blacklozenge S_e$, eventually the $\mathcal{D}$-epoch number of b at q is nondecreasing and unbounded. This implies that $d_q$.epoch[b] > $vec_p[q]$.epoch[b] evaluates to true in line 11 an infinite number of times.□

Lemma 29

For every good process g, epoch g[b] is unbounded.

Proof

Let $t_0$ be the time after which g does not crash. After $t_0$, epoch[b] is nondecreasing. For every good process g', g receives messages from g' infinitely often, so it executes line 11 infinitely often as well. So, by Lemma 28, g' is added into set dislike g[b] an infinite number of times in line 12. By the assumption that a majority of processes are good, |dislike g[b]| > n/2 evaluates to true infinitely often and thus epoch g[b] grows unboundedly.□

Lemma 30

For each good process g, either (1) eventually g permanently $\mathcal{D}'$-suspects b; or (2) the $\mathcal{D}'$-epoch number of b at g is unbounded.

Proof

Let g be any good process and suppose that (1) does not hold. Therefore g $\mathcal{D}'$-trusts b an infinite number of times. Every time g $\mathcal{D}'$-trusts b, it sets the $\mathcal{D}'$-epoch number of b to $epoch_g[b]$. The result now follows from Lemma 29.□

Proof of Theorem 23

The Monotonicity property of $\mathcal{D}'$ follows from Lemma 24. Strong Accuracy follows from Lemmata 25, 26 and 27. Completeness follows from Lemma 30.□

11 Solving Consensus without Stable Storage Using ◆$S_e$

FIG. 5 shows the algorithm that solves consensus without stable storage using ◆$S_e$ (it is less efficient than the one that uses ◆$S'_e$ in Section 6). This algorithm always satisfies the Uniform Agreement and Validity properties of uniform consensus, and if the number of processes that are always up is more than $n_b$, then it also satisfies the Termination property.

In each round k, each process p starts by repeatedly sending its estimate to the current coordinator c (this estimate is called the k-suggestion of p). When c receives a k-suggestion, it responds with the first k-suggestion that it received. Process p waits for a response from the coordinator until it suspects c or detects an increase in the epoch number of c. If p receives a response from c, it updates its estimate to that value. Then, p sets its k-report to its current estimate, and collects the k-reports from other processes (the collect procedure is explained below). If all the collected k-reports are for the same value, then p sets its k-proposal to that value; otherwise, p sets it to "?". Then, p collects the k-proposals from other processes. If some collected k-proposal w is different from ?, then p sets its estimate to w (it will be shown here that p cannot collect two distinct k-proposals different from ?). Moreover, if all collected k-proposals are for w, p decides w.

When a process recovers from a crash, it stops participating in the algorithm except that: (1) it periodically broadcasts a RECOVERED message, and (2) if asked to act as the coordinator for some round r (by receiving an r-suggestion) it will do so. When a process p receives a RECOVERED message from some process q, it adds q to a set $R_p$ of processes known to have recovered.

To collect k-reports, a process p invokes procedure collect (REPORT). In this procedure, p repeatedly sends requests for the k-reports of other processes; when a process receives such a request, it sends back its k-report if it is different from ⊥. After p has received k-reports from $\max(n_b+1, n-n_b-|R_p|)$ processes, it checks whether during the collection of k-reports it detected the recovery of a process that never recovered before ($R_p \neq \text{PrevR}_p$). If so, p restarts the collection of k-reports from scratch; else,p returns from procedure collect(REPORT). Process p collects k-proposals in a similar way.

To illustrate the main ideas of the algorithm, two simplifications were made. First, it was not required that all good processes decide: in fact, this algorithm only guarantees that all always-up processes eventually decide. Second, it was assumed that links satisfy the following Per-Message Fair Loss property (instead of the Fair Loss property of Section 2.5): if a process p sends a message m to a good process q an infinite number of times, then q receives m from p an infinite number of times. These two simplifications are later removed by modifying the algorithm so that: (1) all good processes eventually decide (and eventually stop executing the algorithm), and (2) the algorithm works with links that satisfy the Fair Loss property of Section 2.5.

Theorem 31

The algorithm of FIG. 5 satisfies the Uniform Validity and Uniform Agreement properties of uniform consensus. Moreover, suppose that at most $n_b$ processes are bad, more than $n_b$ processes are always up, and links satisfy the Per-Message Fair Loss property. If all always-up processes propose a value, then they all eventually decide.

The proof follows.

Definition 7

One says that p is in round r at time t if p does not crash by time t and the value of variable $r_p$ at time t is r. A process p starts round r when p sets variable $r_p$ to r in line 7. Process p reaches the end of round r if p completes the execution of the loop in lines 7–17 in round r.

Definition 8

One says that p k-reports v if it sets $\text{report}_p[k]$ to v in line 12 in round k. Similarly, one says that p k-proposes v if it sets $\text{proposal}_p[k]$ to v in line 14.

Definition 9

One says that p completes the collection of k-reports if it returns from the invocation of collect(REPORT) and sets $RV_p[k]$ to the return value in line 13 in round k. Similarly, one says that p completes the collection of k-proposals if it returns from the invocation of collect(PROPOSAL) and sets $PV_p[k]$ to the return value in line 15 in round k.

Lemma 32 (Uniform Validity)

If a process decides v then some process previously proposed v.

Proof

A simple but tedious induction shows that the variable $v_p$ of any process p is always set to some value that was previously proposed by some process. Moreover, clearly the decision value is the value of variable $v_p$ of some process p at some time.□

Lemma 33

For any processes p and q that complete the collection of k-reports $RV_p[k] \cap RV_q[k] \neq \emptyset$.

Proof

For any process p that completes the collection of k-reports, p invokes collect(REPORT) and returns from this invocation. During this invocation, consider the time when p executes line 24 for the last time, and at this time let:

$s_p$ be the value of $\text{seq}_p$;

$P_p$ be the subset of processes from which p has received (k, $s_p$, *, report);

$\underline{R}_p$, the value of set $r_p$.

Clearly, to show that $RV_p[k] \cap RV_q[k] \neq \emptyset$, it is sufficient to show that $P_p \cap P_q \neq \emptyset$. It is first claimed that (1) processes in $\underline{R}_p$ crash before p starts sending (k, sp, REPORT, REQUEST) to any process in round k (line 22). Indeed, when p executes line 24 for the last time during its invocation of collect(REPORT) in round k, it is clear that $\underline{R}_p = R_p$ (by the definition of $\underline{R}_p$) and $R_p = \text{PrevR}_p$ (by the condition in line 24). Therefore, $\text{PrevR}_p = \underline{R}_p$. All processes in $\text{PrevR}_p$ crash before p starts sending (k, $s_p$, REPORT, REQUEST), and so the claim follows.

Note that (2) $|P_p| \geq n_b+1$ (this is due to the guard in line 23). It is now shown that $P_{p \cap \underline{R}_p} = \emptyset$. Let p' ∈ rp. By the previous claim, p' crashes before p starts sending (k, $s_p$, REPORT, REQUEST). This happens before any process sends (k, $s_p$, *, REPORT) to p. So p' crashes before any process sends (k, $s_p$, *, REPORT) to p. Since after a process crashes (and recovers) it does not send REPORT messages, it follows that p' ∉ $P_p$. Thus, $P_{p \cap \underline{R}_p} = \emptyset$.

So, $|P_{p \cup \underline{R}_p}| = |P_p| + |\underline{R}_p|$. By the threshold in line 23, clearly $|P_p| \geq \max(n_b+1, n-n_b-|\underline{R}_p|)$, and thus (3) $|P_p \cup \underline{R}_p| \geq n-n_b$.

By the same argument, it is clear that (4) $|P_q| \geq n_b+1$ and (5) $|P_q \cup \underline{R}_q| \geq n-n_b$.

Now suppose, in order to obtain a contradiction, that $P \cap P_{q=\emptyset}$. By (3) and (4), it is clear that $P_q \cap (P_p \cup \underline{R}_p) \neq \emptyset$. Since $P_p \cap P_q = \emptyset$, then $P_q \cap \underline{R}_p \neq \emptyset$. Let p' ∈ $P_q \cap \underline{R}_p$. Clearly, q starts sending (k, $s_q$, REPORT, REQUEST) to processes before p' receives such a message, which happens before p' sends a message of the form (k, $s_q$, *, REPORT) to q (p' sends such message because p' ∈ $P_q$), which happens before p' crashes (since after a process crashes and recovers, it does not send REPORT messages), which happens before p starts sending (k, $s_p$, REPORT, REQUEST) to processes (this follows from the fact that p' ∈ $\underline{R}_p$ and claim (1)). From all this, one can conclude that q starts sending (k, $s_q$, REPORT, REQUEST) before p starts sending (k, $s_p$, REPORT, REQUEST).

By (2) and (5), $P_p \cap (P_q \cup \underline{R}_q) \neq \emptyset$. By an argument analogous to the one above, one can conclude that p starts sending (k, $s_p$, REPORT, REQUEST) before q starts sending (k, $s_q$, REPORT, REQUEST). This is a contradiction. Hence, it must be concluded that $P_p \cap P_q \neq \emptyset$.□

Lemma 34

If p and q k-propose v≠? and v'≠?, respectively, then v=v'.

Proof

If p k-proposes v≠?, then p sets proposal p[k] to v in line 14. Thus $RV_p[k]=\{v\}$. Similarly, $RV_q[k]=\{v'\}$. By Lemma 33, $RV_p[k] \cap RV_q[k] \neq \emptyset$. Therefore, v=v'.□

Lemma 35

If p completes the collection of k-proposals, then $PV_p[k]$ contains at most one value different from ?.

Proof

In order to obtain a contradiction, suppose that this is not true, i.e., there exist v≠? and v'≠? such that v≠v' and v,v' ∈ $PV_p[k]$. Every value in $PV_p[k]$ is k-proposed by some process, so there exist processes q and q' that k-propose v and v', respectively. By Lemma 34, v=v'—a contradiction.□

Lemma 36

For any processes p and q that complete the collection of k-proposals, $PV_p[k] \cap PV_q[k] \neq \emptyset$.

Proof

This proof is similar to the proof of Lemma 33.□

Lemma 37

If in round k some process p decides v, then all processes q that reach the end of round k set variable $v_q$ to v in line 16. Moreover, if q decides v' in round k then v=v'.

Proof

Since in round kp decides v, then v≠? and $PV_p[k]=\{v\}$. For every process q that reaches the end of round k, q completes the collection of k-proposals, and thus by Lemma 36, v ∈ $PV_q[k]$. By Lemma 35, v is the only value in $PV_q[k]$ different from ?, so q sets variable $v_q$ to v in line 16. Moreover, since v ∈ $PV_q[k]$, if q decides v' then v=v'.□

Lemma 38

If all processes p that reach the end of round k set variable $v_p$ to v in line 16, then all processes that (k+1)-report a value (k+1)-report v.

Proof

This is clear from the fact that every value (k+1)-reported is the value of variable $v_p$ at the end of round k for some process p.□

Lemma 39

If all processes that k-report a value k-report the same value v, then all processes p that reach the end of round k set variable $v_p$ to v in line 16 and decide v.

Proof

First note that processes cannot k-report ?, because no process p can set its variable $v_p$ to ? at any time. If all processes that k-report a value k-report the same value v, then for all processes p that complete the collection of k-reports, $RV_p[k]=\{v\}$. Thus all processes that k-propose a value k-propose the same value v. Therefore, for all processes p that complete the collection of k-proposals, $PV_p[k]=\{v\}$. Since v≠?, all processes p that reach the end of round k set variable $v_p$ to v in line 16 and decide v.□

Lemma 40 (Uniform Agreement)

No two processes decide differently.

Proof

Suppose process p decides v in round k and process q decides v' in round k'. It is now shown that v=v'.

Assume without loss of generality that k≤k'. If k=k', then v'=v by Lemma 37. Now suppose k<k'. By Lemma 37, all processes p' that reach the end of round k set variable $v_{p'}$ to v in line 16. By Lemma 38, all processes that (k+1)-report a value (k+1)-report v. By Lemma 39, all processes p' that reach the end of round k+1 set variable $v_{p'}$ to v in line 16 and decide v. By repeatedly applying Lemmata 38 and 39, it must be concluded that all processes that reach the end of round k' decide v. Since q reaches the end of round k', it decides v in round k', and so v=v'.□

Henceforth assume that at most $n_b$ processes are bad, more than $n_b$ processes are always up, and links satisfy the Per-Message Fair Loss property.

Lemma 41

If an always-up process p starts a round k, then eventually it k-reports a value.

Proof

In order to obtain a contradiction, suppose that p never k-reports any value. Then p loops forever in lines 9–10 in round k. Let c be the coordinator of round k. If c is a bad process, then according to the Monotonicity and Completeness property of ♦$S_e$, either eventually p permanently suspects c or the epoch number of c at p is nondecreasing and unbounded. Thus eventually the guard in line 10 is true and p does not loop forever in lines 9–10. So c is a good process. Process p sends (k, $v_p$, SUGGESTION) to c infinitely often (line 9). By the Per-Message Fair Loss property, c receives this message from p infinitely often. Since c is a good process, there is a time t after which c does not crash. After time t, every time c receives (k, $v_p$, SUGGESTION) from p, c sends the same message (k, w, ESTIMATE) to p. So c sends (k, w, ESTIMATE) top infinitely often. By the Per-Message Fair Loss property, p eventually receives this message. Therefore, p does not loop forever in lines 9–10—a contradiction.□

Lemma 42

If all always-up processes k-report a value, then eventually they all k-propose a value.

Proof

In order to obtain a contradiction, suppose that all always-up processes k-report a value, but there is an always-up process p that never k-proposes any value. So p never returns from the invocation of collect(REPORT) in round k. Process p loops forever either in lines 20–24 or 22–23. Since set $R_p$ is finite and p never removes any process from $R_p$, eventually condition $R_p$=Prev$R_p$ in lines 24 is always true. Therefore, p loops forever in lines 22–23. Thus for some value $s_p$, p sends (k, $s_p$, REPORT, REQUEST) to all processes infinitely often.

For every always-up process q, by the Per-Message Fair Loss property, q receives (k, $s_p$, REPORT, REQUEST) from p infinitely often. Since q k-reports a value, there is a time t after which report q[k]=w for some w≠⊥. So after time t, every time q receives (k, $s_p$, REPORT, REQUEST) from p, q sends (k, $s_p$, w, REPORT) to p (line 32). Thus q sends (k, $s_p$, w, REPORT) to p infinitely often. By the Per-Message Fair Loss property, eventually p receives (k, $s_p$, w, REPORT) from q. Therefore eventually p receives messages of the form (k, $s_p$, *, REPORT) from all always-up processes. Since more than $n_b$ processes are always up, eventually p receives messages of the form (k, $s_p$, *, REPORT) from at least $n_b$+1 processes.

For every eventually-up process q, it is clear that eventually p receives a RECOVERED message from q, since after q's last recovery q sends RECOVERED messages to all processes infinitely often. Therefore, eventually $R_p$ contains all eventually-up processes. Since there are at most $n_b$ bad processes, eventually the number of always-up processes is at least n−$n_b$−|$R_p$|. Therefore, eventually p receives messages of the form (k, $s_p$, *, REPORT) from at least $n-n_b-|R_p|$ processes.

Hence, eventually p receives messages of the form (k, $s_p$, *, REPORT) from max($n_b+1$, $n-n_b-|R_p|$) processes, so the guard in line 23 is true. Therefore process p does not loop forever in lines 22–23—a contradiction.□

Lemma 43

If all always-up processes k-propose a value then eventually they all reach the end of round k Proof Similar to the proof of Lemma 42.□

Corollary 44

If all always-up processes propose, then for every $k \in \{1, 2, 3, \ldots\}$, eventually they all reach the end of round k.

Proof

If all always-up processes propose, they all start round 1. Lemmata 41, 42 and 43 show that if all always-up processes start a round r then eventually they all reach the end of round r; thus, they all start round r+1. The proof follows by induction.□

Lemma 45

There exists a round k such that all processes that k-report a value k-report the same value.

Proof

Choose a time T such that (1) all processes that are not always-up have crashed at least once by time T, (2) all good processes remain up forever after time T, and (3) for some good process c, for every good process g, after time T, g permanently trusts c and the epoch number of c at g stops changing (Such a process c can be found by the Accuracy property of ◆$S_e$). Choose a round k such that no process starts round k by time T, and c is the coordinator of round k.

Let p be a process that k-reports a value. Then p eventually exits the loop in lines 9–10. Moreover, by definition of k, p starts round k after time T. Only always-up processes can start a round after time T, because all other processes crashed at least once by time T and, after they crash, they never start any round. Thus, p is an always-up process, and so in round k, p never suspects c and the epoch number of c at p never increases. Thus, p can only exit the loop in lines 9–10 by receiving (k, w, ESTIMATE) from c, for some w≠⊥. Since p eventually exits this loop, it receives (k, w, ESTIMATE) from c. Therefore, there is a time at which coord_est$_c$[k]=w. Note that c never receives any message of the form (k, *, SUGGESTION) by time T, because no process starts round k by time T. Therefore, the value of coord_est$_c$[k] is ⊥ before or at time T. Thus, c sets coord_est$_c$[k] to w after time T. Since c does not crash after time T, once c sets coord_est$_c$[k] to w, it never changes this variable again. This implies that every process that k-reports a value receives (k, w, ESTIMATE) from c, and then k-reports w.□

Lemma 46

If all always-up processes propose a value then they all eventually decide.

Proof

Suppose that all always-up processes propose a value. By Lemma 45, there exists a round k such that all processes that k-report a value k-report the same value. By Corollary 44, all always-up processes reach the end of round k. By Lemma 39, all always-up processes decide in round k.□

Proof of Theorem 31

Immediate from Lemmata 32, 40, and 46.□

Following is an explanation of how to remove the two limitations mentioned at the beginning of this section. The first one is that the algorithm in FIG. 5 does not guarantee that eventually-up processes decide; moreover processes never stop executing rounds. To fix these problems, the algorithm must be modified as follows. Once a process p decides, it stops executing the algorithm. Then, every time that p receives any message it replies with the decision value. When a process receives the decision value, it decides. With this modification, all good processes decide and all processes eventually stop executing rounds.

The second limitation is that the algorithm does not work with the Fair Loss property of Section 2.5. The following explains why, and then a modified version of the algorithm to fix this problem is presented.

There are two types of messages in the algorithm: active messages, i.e., those that are actively sent by processes (SUGGESTION, REQUEST and RECOVERED messages), and passive messages, which are sent in response to an active message (ESTIMATE, REPORT, PROPOSAL and "decide" messages). In the algorithm, a process p proceeds by sending an active message to other processes, until it gets responses; then p sends a different active message, and so on. The problem arises when p repeatedly sends an active message to q, while q repeatedly sends another active message to p. Every time p receives the active message from q, p replies with a passive message, and vice-versa. Thus, p repeatedly sends both an active and a passive message to q, and vice-versa. With the Fair Loss property, it is possible that all the active messages are received and all the passive ones are lost. Thus, p and q never receive a reply from each other.

To fix this problem, the algorithm is modified as follows. For all p and q, process p now keeps a copy of the last message of each type (active or passive) that it wants to send to q. Every time p sends an active or passive message to q in the original algorithm, in the modified algorithm it actually sends a tuple consisting of both the last active and the last passive messages to q. When q receives such a tuple, it processes both components separately (as if q had received both messages separately in the original algorithm). With this modification, the algorithm will work with the Fair Loss property.

From the above:

Theorem 47

Assume that at most $n_b$ processes are bad and more than $n_b$ processes are always up. Uniform consensus can be solved without stable storage using ◆$S_e$.

12 Implementation of ◆$S_e$ and ◆$S'_e$ in Partially Synchronous Systems

This section shows how to implement ◆$S_e$ and ◆$S'_e$ in the traditional models of partial synchrony, extended to systems with crashes and recoveries. Roughly speaking, the first model, denoted $\mathcal{M}_1$ here, stipulates that in every execution there are bounds on process speeds and on message transmission times, but these bounds are not known. In the second model, denoted $\mathcal{M}_2$, these bounds are known, but they hold only after some unknown time (called GST for Global Stabilization Time). A weaker model of partial synchrony is defined traditionally, denoted $\mathcal{M}_3$, in which bounds exist but they are not known and they hold only after some unknown GST. In $\mathcal{M}_1$ links do not lose messages, and in $\mathcal{M}_2$ and $\mathcal{M}_3$ links can only lose messages sent before the GST. Note that every system that conforms to $\mathcal{M}_1$ or $\mathcal{M}_2$ also conforms to $\mathcal{M}_3$.

All the above models assume that process crashes are permanent. A natural extension of $\mathcal{M}_3$ to systems with crashes and recoveries, which is also denoted $\mathcal{M}_3$, is as follows: after some (unknown) GST, all the good processes are up forever, and there are bounds on process speeds and on message transmission times. In particular, all the messages sent to good processes after the GST, including those sent by unstable processes, are received within the (unknown) bound. Messages sent to bad processes may be lost. Henceforth, $\mathcal{M}_3$ denotes this extended model.

FIG. 6 shows an implementation of $\blacklozenge S_e$ (and also of $\blacklozenge S'_e$) in $\mathcal{M}_3$. To measure elapsed time, each process p maintains a local clock, say, by counting the number of steps that it takes. After each recovery, each process p first sends an I-RECOVERED message to all processes; then it periodically sends an I-AM-ALIVE message. If p does not receive an I-AM-ALIVE message from some process q for $\Delta_p[q]$ time units on its clock, p removes q from its list of trusted processes. When p receives I-AM-ALIVE from some process q, it checks if it currently suspects q. If so, p knows that its previous time-out on q was premature and so p adds q to its list of trusted processes and increases its time-out period $\Delta_p[q]$. When p receives I-RECOVERED from some process q, it increments the epoch number of q. Note that this implementation does not use any stable storage.

When this algorithm is executed in $\mathcal{M}_3$, there is a time after which every good process trusts every good process and suspects every eventually-down process. It is also easy to see that at every good process, eventually the epoch numbers are nondecreasing (this occurs after the process stops crashing). Moreover, good processes send I-RECOVERED messages only a finite number of times, so that the epoch numbers of each good process at every good process eventually stop changing. It remains to show that for every unstable process u and every good process g, either eventually g permanently suspects u or u's epoch number at g is unbounded. Indeed, if g does not permanently suspect u, then it trusts u infinitely often; in this case, g receives I-AM-ALIVE messages from u infinitely often. So u sends I-AM-ALIVE messages to g infinitely often. Note that after each recovery, u always sends I-RECOVERED message before sending I-AM-ALIVE messages. Therefore, u sends I-RECOVERED messages infinitely often. Thus, g receives I-RECOVERED messages from u infinitely often and so g increments u's epoch number infinitely often.

Hence:

Theorem 48

In any partially synchronous system that conforms to $\mathcal{M}_3$, the algorithm in FIG. 6 guarantees that (1) at every good process, eventually the epoch numbers are nondecreasing, (2) for every bad process b and every good process g, either eventually g permanently suspects b or b's epoch number at g is unbounded, and (3) for every good process g, eventually g is permanently trusted by every good process, and g's epoch number at every good process stops changing.

Corollary 49

In any partially synchronous system that conforms to $\mathcal{M}_3$, the algorithm in FIG. 6 implements $\blacklozenge S_e$ and $\blacklozenge S'_e$.

Note that the algorithm does not implement $\blacklozenge S_u$ in $\mathcal{M}_3$. This is because an unstable process u resets its timeouts to a default value infinitely often, and if this value is smaller than the (unknown) bound on message delays, then u may suspect every process infinitely often—a violation of the strong accuracy property of $\blacklozenge S_u$. In Section 10, however, is shown how to transform any implementation of $\blacklozenge S_e$ into $\blacklozenge S_u$ (this transformation does not rely on partial synchrony assumptions).

13 Proof of Theorem 22

Theorem 22

The algorithm of FIG. 3 satisfies the Uniform Validity and Uniform Agreement properties of uniform consensus. If a majority of processes are good then it also satisfies the Termination property.

The proof follows.

Definition 10

One says that p is in round r at time t if the value of variable r p in stable storage at time t is r. A process p starts round r when p stores r as the value of r p for the first time in line 12. One says that p updates $\text{estimate}_p$ to est when p stores est as the value of $\text{estimate}_p$ (in line 25 or 39). Similarly, one says that p updates $ts_p$ to t when p stores t as the value of $ts_p$ (in line 25 or 39).

Lemma 50 (Uniform Validity)

If a process decides v then some process previously proposed v.

Proof

Trivial.□

Lemma 51

A process can update $\text{estimate}_p$ and $ts_p$ at most once in each round.

Proof

Let r be a round and p be a process. In round r, if p is the coordinator of round r then p can only update $\text{estimate}_p$ and $ts_p$ in line 25; else, p can only update $\text{estimate}_p$ and $ts_p$ in line 39. When p updates $\text{estimate}_p$ and $ts_p$, it updates $ts_p$ to r. After it does so, it can not execute lines 25 and 39 in round r again (even if it crashes and later recovers) because of the guard in lines 16 and 33, respectively.□

Lemma 52

Let c be the coordinator of some round r. (1) in round r, if c starts Phase NEWESTIMATE with $\text{estimate}_c$=est, then c updates $\text{estimate}_c$ to est; and (2) in some round r'>r, if some process p s-sends (r', est, r, ESTIMATE) in line 34, then in round r, c updates $\text{estimate}_c$ to est.

Proof

To prove (1), assume that in round r, c starts Phase NEWESTIMATE with $\text{estimate}_c$=est. Clearly, before c starts Phase NEWESTIMATE, it updates $\text{estimate}_c$ to some value est'. By Lemma 51, c updates $\text{estimate}_c$ at most once in round r. Therefore est=est'. This shows (1).

To prove (2), assume that in some round r'>r some process p s-sends (r', est, r, ESTIMATE) in line 34. It is first claimed that in round r, p updates $\text{estimate}_p$ to est. Indeed, since $ts_p$=r when p executes line 34 in round r', p must have executed line 24 or 38 in round r to set $ts_p$ to r, and then stored $ts_p$ in line 25 or 39 in round r. Let est' be the value of $\text{estimate}_p$ that p stores in line 25 or 39 in round r. It must be shown that est'=est. Indeed, it is clear that when p executes line 34 in round r', the values of $\text{estimate}_p$ and $ts_p$ in stable storage are est and r, respectively (this is because every time p changes $\text{estimate}_p$ or $ts_p$, it stores its new value in stable storage—see lines 25 and 39). Moreover, from the structure of the algorithm, the value of $ts_p$ in stable storage is nondecreasing, so that after p stores $ts_p$ in round r, its value in stable storage does not change until round r'. Note that $\text{estimate}_p$ and $ts_p$ are always updated together. So after p stores $\text{estimate}_p$ in round r, the value of $\text{estimate}_p$ in stable storage also does not change until round r'. So est'=est, and this shows the claim.

Now there are two cases. If p=c (i.e., p is the coordinator of round r), then part (2) follows immediately from the claim. If p≠c, then p does not execute line 25 in round r, and so by the claim p stores est as the value of $\text{estimate}_p$ in line 39 in round r. Thus p must have received (r, est, NEWESTIMATE) from c, which implies that c must have s-sent this message to p in line 27 in round r. By part (1), c updates $\text{estimate}_c$ to est in round r.□

Lemma 53

Suppose that the coordinator c of round r s-sends (est, DECIDE) in line 30. In every round r'≥r, if the coordinator c' updates $\text{estimate}_{c'}$ to some value est' then est=est'.

Proof

This lemma is proved by induction on the round number r'. For the base case (r'=r), note that if c s-sends (est, DECIDE) in line 30, then c starts Phase NEWESTIMATE with $estimate_c$=est. The base case now follows directly from Lemmata 51 and 52 (1).

Now assume that the lemma holds for all r', r≦r'<k. Let c' be the coordinator of round k. It is now shown that the lemma holds for r'=k.

Suppose that in round k, c' updates $estimate_{c'}$ to some value est'. Since c' is the coordinator of round k, this update can only happen in line 25. Then c' received messages of the form (k, *, *, ESTIMATE) from ⌈(n+1)/2⌉ processes in the wait statement in line 18. Since c executes line 30 in round r, c receives (r, ACK) from ⌈(n+1)/2⌉ processes. Thus, there is some process p such that (1) in round r, c receives (r, ACK) from p, and (2) in round k, for some est" and ts", c' receives (k, est", ts", ESTIMATE) from p in the wait statement in line 18. By (1), p s-sends (r, ACK) to c in round r. By (2),p s-sends (k, est", ts", ESTIMATE) to c' in round k. Before doing that, p starts round k. After p starts round k, p never starts a round lower than k. This implies that p s-sends (k, est", ts", ESTIMATE) to c' in round k after p s-sends (r, ACK) to c in round r. Before s-sending (r, ACK) to c in round r, p updates $ts_p$ to r (line 25 or 39). Since the value of $ts_p$ in stable storage is non-decreasing, it must be that ts"≧r. It is easy to see that no process ever s-sends a message of the form (k, *, ts, ESTIMATE) with ts≧k. So, the value t that c' selects in line 20 in round k is such that r≦t<k. Let q be the process whose estimate value est' is selected in line 22 in round k. Then in round k, q s-sends (k, est', t, ESTIMATE). By Lemma 52 (2), the coordinator c" of round t updated $estimate_{c''}$ to est'. By the induction hypothesis, then, est'=est.□

Lemma 54

If processes c and c' s-send (est, DECIDE) and (est', DECIDE) in line 30 in rounds r and r', respectively, then est=est'.

Proof

Assume without loss of generality that r'≧r. Since line 30 is executed only by the coordinator, c and c' are the coordinators of rounds r and r', respectively. Since c' s-sends (est', DECIDE) in line 30 in round r', c' starts Phase NEWESTIMATE with $estimate_{c'}$=est'. By Lemma 52 (1), c' updates $estimate_{c'}$ to est'. By Lemma 53, est=est'.□

Lemma 55 (Uniform Agreement)

No two processes decide differently.

Proof

Suppose that processes p and p' decide on values est and est', respectively. Process p decides est in line 53 after receiving message (est, DECIDE). By a simple induction, some process must have s-sent message (est, DECIDE) in line 30. Similarly, process p' decides est' in line 53, and so some process must have s-sent message (est', DECIDE) in line 30. By Lemma 54, est=est'.□

Lemma 56

A process can start only finitely many rounds.

Proof

In order to obtain a contradiction, suppose that there are processes that start infinitely many rounds. Let P be the set of all such processes. Clearly, P contains only good or unstable processes. For any process p ∈ P and any round r≧1, p eventually starts a round higher than r. Let $r_p^+$ be the lowest round higher than r that p starts and let $r_p^-$ be the highest round lower than or equal to r that p starts. Then $1 \leq r_p^- \leq r < r_p^+$.

By the Strong Accuracy Property of ◆$S_u$, both a time T and a good process K can be found such that after T, K is never suspected by any good or unstable process and the epoch number of k at every good or unstable process stops changing.

Let r be a round such that (1) k is the coordinator of round r, and (2) no process in Π\P starts a round higher than r, and (3) for every p ∈ P, p starts round $r_p^-$ after time T. Such round clearly exists because processes in Π\P start only finitely many rounds and processes in P start infinitely many rounds.

Let p be the first process to start a round higher than r. By (2), p ∈ P and by the definition of $r_p^-$ and $r_p^+$, p selects round $r_p^+$ when it executes line 49 in round $r_p^-$. This implies that $r_p^-$=r: indeed, if $r_p^-$<r then p does not select round $r_p^+$ in line 49; instead, it selects a round number that is at most r since (a) p trusts the coordinator K of round r (by (3) and the definitions of T and K), and (b) p does not receive any messages of a round higher than r (since p is the first process to start a round higher than r). So $r_p^-$=r. By (3), p starts round r after time T. By (1) and the definitions of T and K, while p is in round r, condition K ∈ d.trustlist in line 44 evaluates to true and condition (K∉d'.trustlist or d.epoch[K]<d'.epoch[K]) in line 46 always evaluates to false. Since p starts a round higher than r, it does not loop forever in lines 45–46. So p eventually receives a message of a round higher than r while in round r. This contradicts the fact that p is the first process to start a round higher than r.□

Definition 11

One says that a good process p blocks in round r if p starts round r but p does not start a higher round, and p never decides.

Lemma 57

If a good process p blocks in round r, then in this round its skip_round task loops forever in lines 45–46.

Proof

Clearly, while process p is in round r, its task skip round must loop forever in lines 45–46 or in line 48 (otherwise p starts a round higher than r). By the Strong Accuracy property of ◆$S_u$, p eventually trusts some process forever and so p cannot loop forever in line 48. Therefore p loops forever in lines 45–46.□

Definition 12

One says that an eventually-up process stabilizes at time t if it recovers at time t and does not crash afterwards. By convention, one says that an always-up process stabilizes at time 0.

Lemma 58

Suppose a good process p proposes but never decides. If p receives a message of round r after p stabilizes, then eventually p starts some round r'≧r.

Proof

In order to obtain a contradiction, suppose that p never starts any round r'≧r. Since p proposes, p starts some round (namely, round 1). Since p does not decide, p blocks in some round r"<r. By Lemma 57, while in round r", the skip_round task of p loops forever in lines 45–46. Since p receives a message of round r after p stabilizes, p eventually exits the loop in lines 45–46. This is a contradiction.□

Lemma 59

Let p and q be two good processes. If (1) p s-sends m to q after p stabilizes, (2) m is the last message p s-sends to q, and (3) p never decides, then q receives m from p infinitely often.

Proof

By (1), (2) and (3), p sends m to q infinitely often in task retransmit (line 7). By the Fair Loss property of links, q receives messages from p infinitely often. Note that m is the only message that p sends to q infinitely often: this is because (1) in task retransmit, p eventually sends no message different from m to q, and (2) outside task retransmit, p can only send messages of the form (*, DECIDE) (line 56); however, such messages are never sent since p never decides. Therefore, by the No Creation and Finite Duplication properties of links, q receives from p only finitely many messages different from m. Since q receives messages from p infinitely often, it follows that q receives m from p infinitely often.□

Lemma 60

If a good process p blocks in a round r, then the coordinator c of this round is also a good process. Moreover, if p≠c then c receives messages of round r from p infinitely often.

Proof

Let p by a good process that blocks in round r and let c be the coordinator of round r. It is now proved that c is a good process. In order to obtain a contradiction, suppose that c is bad. Since p blocks in round r, by Lemma 57, while in round r" the skip_round task of p loops forever in lines 45–46. By the Completeness and Monotonicity properties of ♦$S_u$, eventually either p permanently suspects c or c's epoch number at p is nondecreasing and unbounded. Therefore, p eventually exits the loop in lines 45–46. This is a contradiction. So c is a good process.

Now, assume p≠c. After p stabilizes, it s-sends a message to c for the last time in round r, either in line 34 or in line 41. By Lemma 59, c receives this message from p infinitely often.□

Lemma 61

Let p and q be good processes. If p decides and p receives non-DECIDE messages from q infinitely often, then eventually q decides.

Proof

After p decides, every time p receives a non-DECIDE message from q, p sends a DECIDE message to q (line 56). Therefore p sends DECIDE messages to q infinitely often. Moreover, this is the only message that p sends to q infinitely often (since after p decides, it terminates all tasks). This implies that q receives DECIDE messages from p infinitely often. Thus, eventually q decides.□

Lemma 62

Suppose all good processes propose. If some good process decides then eventually all good processes decide.

Proof

In order to obtain a contradiction, suppose that every good process proposes and some good process p decides, but there is some good process q that never decides. Let Q be the set of good processes that do not decide. By Lemma 56, for every q∈Q, q can start only finitely many rounds. Since q proposes, q blocks in some round $r_q$. Let r=max$\{r_q | q \in Q\}$, and let q ∈ Q be a process that blocks in round r.

Case 1: q is the coordinator of round r. Process q never decides, so in round r either q waits forever at line 18 or at line 28 (otherwise q s-sends a DECIDE message to itself in line 30 and then decides in line 53). Before q waits forever, it s-sends a non-DECIDE message to p (line 17 or 27). By Lemma 59, p receives this message infinitely often. By Lemma 61, q eventually decides. This contradicts the fact that q ∈ Q.

Case 2: q is not the coordinator of round r. Let c≠q be the coordinator of round r. By Lemma 60, c is a good process and c receives messages of round r from q infinitely often. If c decides, then by Lemma 61, q eventually decides too and this contradicts the fact that q ∈ Q. So c never decides. By Lemma 58, eventually c starts a round r'≧r. Since c ∈ Q, by the definition of r, it is clear that r'≦r. Thus r'=r and so c blocks in round r. By Case 1, c eventually decides—a contradiction.□

Lemma 63

Suppose there is a majority of good processes. If every good process proposes a value, then eventually some good process decides.

Proof

In order to obtain a contradiction, suppose that no good process decides. By Lemma 56, each good process p can start only finitely many rounds. Since p proposes, p blocks in some round $r_p$. Let r=max$\{r_p | p$ is good$\}$ and let p be a good process that blocks in round r.

Case 1: p is the coordinator of round r. Process p never decides, so in round r either p waits forever at line 18 or at line 28.

Case 1.1: p waits forever at line 18 It is now claimed that for every good process q, p eventually receives (r, estimate$_q$, ts$_q$, ESTIMATE) from q after p stabilizes. Then by the assumption that there is a majority of good processes, p does not wait forever at line 18—a contradiction.

To show the claim, note that since p waits forever at line 18 of round r, then ts$_p$≠r. Thus, p never updates ts$_p$ to r, and so p never updates estimate$_p$ in round r. By Lemma 52 (1), p never starts Phase NEWESTIMATE. So p never s-sends NEWESTIMATE messages in round r.

Case 1.1.1: q=p. Since ts$_p$≠r, in round r, after p stabilizes and forks task participant, p s-sends (r, estimate$_p$, ts$_p$, ESTIMATE) to itself (line 34). Thus p receives this message after it stabilizes.

Case 1.1.2: q≠p. Before p waits forever at line 18, it s-sends (r, NEWROUND) to q (line 17) after p stabilizes, and this is the last message p s-sends to q. By Lemma 59, q eventually receives (r, NEWROUND) after q stabilizes. By Lemma 58, q eventually starts a round r'≧r. By the definition of r, it is clear that r'≦r. Thus r'=r and so q starts round r. In round r, it is clear that ts$_q$≠r (otherwise, q sets ts$_p$ to r in line 39, which implies that q received a NEWESTIMATE message from p—contradicting the fact that p never s-sends NEWESTIMATE messages). Then q s-sends message (r, estimate$_q$, ts$_q$, ESTIMATE) top (line 34). Process q waits forever in line 35 since p never s-sends a NEWESTIMATE message to q. Therefore (r, estimate$_q$, ts$_q$, ESTIMATE) is the last message q s-sends to p. By Lemma 59, p eventually receives (r, estimate$_q$, ts$_q$, ESTIMATE) from q after p stabilizes.

This concludes the proof of the claim.

Case 1.2: p waits forever at line 28 It is now claimed that for every good process q, p eventually receives (r, ACK) from q after p stabilizes. Then by the assumption that there is a majority of good processes, p does not wait forever at line 28—a contradiction.

The claim is now shown.

Case 1.2.1: q=p. Before p waits forever at line 28, it s-sends a NEWESTIMATE message to itself (and it does so after p stabilizes). Thus p receives this message from itself. So in task participant, p finishes Phase ESTIMATE and s-sends (r, ACK) to itself. Therefore p receives this message from itself after it stabilizes.

Case 1.2.2: q≠p. Before p waits forever at line 28, it s-sends (r, estimate$_p$, new estimate) to q and this is the last message p s-sends to q. By Lemma 59, q eventually receives this message from p after q stabilizes. By Lemma 58, q eventually starts a round r'≧r. By the definition of r, then r'≦r. Thus r'=r and so q blocks in round r. In round r, after q stabilizes and forks task participant, q finishes Phase ESTIMATE (since q receives a NEWESTIMATE message from p) and s-sends message (r, ACK) top in Phase ACK. This is the last message q s-sends to p, since q blocks in round r.

By Lemma 59, p eventually receives (r, ACK) from q after p stabilizes.

This shows the claim.

Case 2: p is not the coordinator of round r. Let c≠p be the coordinator of round r. By Lemma 60, c is a good process and c receives messages of round r from p infinitely often. By Lemma 58, c eventually starts a round r'≧r. By the definition of r, it is clear that r'≦r. Thus r'=r and so c blocks in round r. In Case 1, it was shown that the coordinator of round r does not block in round r—a contradiction.□

Corollary 64 (Termination)

Suppose there is a majority of good processes. If all good processes propose a value, then they all eventually decide.

Proof

From Lemmata 62 and 63.□

Proof of Theorem 22

Immediate from Lemmata 50 and 55, and Corollary 64.□

Conclusion, Ramifications, and Scope of Invention

As the use of computer networks in safety-critical systems increases (e.g., Fly-by-wire commercial aircraft, systems, automated train and subway operation systems, airline traffic control systems, medical systems, banking and stock market systems, etc.) the demand for fault-tolerant and highly-available distributed systems also rapidly increases. The ability to detect failures is crucial to such systems, and failure detectors with epoch numbers detect both permanent and transient processor crashes. Thus, they are particularly useful for safety-critical systems in networks with crash/recoveries. Furthermore, most such systems contain a protocol to reach consensus among processes despite failures. With the invention's consensus protocol, such systems can run with fewer (or no) access to stable storage, and thus they can run faster and more efficiently.

From the above descriptions, figures and narratives, the invention's advantages in detecting and handling process failures in distributed systems should be clear.

Although the description, operation and illustrative material above contain many specificities, these specificities should not be construed as limiting the scope of the invention but as merely providing illustrations and examples of some of the preferred embodiments of this invention.

Thus the scope of the invention should be determined by the appended claims and their legal equivalents, rather than by the examples given above.

What is claimed is:

1. A method for detecting failure in a computer system comprising the steps of:
   generating and sending a heartbeat signal representative of the vitality of each processor;
   sending a message from a processor each time the processor recovers from a failure;
   counting the number of recoveries for each processor;
   generating an epoch signal representative of the number of recoveries for each processor including the epoch number signal for each processor in its corresponding hearbeat signals.

2. The method of claim 1 further comprising the step of identifying a processor as unstable when its epoch number increases.

3. A fault detector for a computer system comprising:
   means for generating and sending a hearbeat signal representative of the vitality of each processor;
   means at each processor in the computer system for sending a message from each processor each time the processor recovers from a failure;
   means for counting the number of recoveries for each processor;
   means for generating an epoch signal representative of the number of recoveries for each processor;
   means for including the epoch number signal for each processor in its corresponding heartbeat signals.

4. A method for detecting failure in a multi-process computer system comprising the steps of:
   generating and sending a heartbeat signal representative of the vitality of each process;
   generating an epoch number signal corresponding to the number of times each process recovers from a failure; and
   including the epoch number signal for each process in its corresponding heartbeat signals.

5. The method of claim 4 further comprising the step of identifying a processor as unstable when its epoch number increases.

6. A multi-process computer system with a heartbeat failure detector comprising:
   means for generating and sending a heartbeat signal representative of the vitality of each process;
   means for generating an epoch number signal corresponding to the number of times each process recovers from a failure; and
   means for including the epoch number signal for each process in its corresponding heartbeat signals.

7. The computer system of claim 6 further comprising means for identifying a processor as unstable when its epoch number increases.

8. A method for reaching consensus in a multi-process computer system where processes may crash and later recover comprising:
   selecting one of the processes as a coordinator for a consensus round;
   keeping a list of recovered processes at the coordinator;
   at the coordinator receiving recovery signals from a recovered process;
   at the coordinator adding any newly recovered processes to the recovered process list upon receiving recovery signals;
   sending a newround signal from the coordinator to each recovered process;
   sending a current estimate with a time stamp from each participant in a round to the coordinator in response of the newround signal;
   at the coordinator receiving current estimates and time stamps from processes at the coordinator;
   at the coordinator terminating reception of further current estimates and time stamps after the coordinator receives a predetermined number of estimates;
   if during the recevieng current estimate step or more new processes are added into the coordinator's recovered process list, then repeating the above collecting estimates step;
   choosing the received estimate from the responding processes with the largest time stamp;
   broadcasting from the coordinator a new estimate to all processes;
   changing the estimate of each participant to the new estimate received from the coordinator;
   from each participant sending an acknowledgment signal to the coordinator upon the receipt of the new estimate;
   at the coordinator receiving the acknowledgements sent by the processes;
   terminating reception at the coordinator of further acknowledgements from processes after the receipts exceed a certain threshold;

if the coordinator adds one or more new processes to its recovered process list during reception of the acknowledgements, then repeating the above collecting acknowledgment step;

broadcasting the current coordinator's estimate as the decision value.

9. The method of claim 8 further comprising generating and sending a heartbeat signal representative of the vitality of each process;

generating an epoch number signal corresponding to the number of times each process recovers from a failure; and including the epoch number signal for each process in its corresponding heartbeat signals.

10. The method of claim 9 further comprising the step of abandoning the current coordinator process if the epoch number of the current coordinator process increases.

11. The method of claim 9 further comprising the step of a process interrupting and terminating the consensus round if the process detects an increase in the epoch number of the coordinator, a recovery signal issued by the coordinator, or receives a message from a subsequent consensus round.

12. The method of claim 8 further comprising the step of periodically retransmitting its last message to the other processes.

13. The method of claim 8 further comprising the step of locking the decision value in all processes that are still alive.

14. The method of claim 13 further wherein the number of acknowledgements for terminating a round and locking a decision value is $(\max(n_b+1, n-n_b-|R_p|))$.

15. A multi-process consensus computer system where one or more processes may crash and later recover comprising:

means for selecting one of the processes as a coordinator for a consensus round;

means for keeping a list of recovered processes at the coordinator;

means at the coordinator for receiving recovery signals from a recovered process;

means at the coordinator for adding recovered processes to the recovered process list upon receiving recovery signals;

means for sending a newround signal from the coordinator to each recovered process;

means for sending a current estimate with a time stamp from each participant in a round to the coordinator in response of the newround signal;

means at the coordinator for receiving current estimates and time stamps from processes at the coordinator;

means at the coordinator for terminating reception of current estimates and time stamps after the coordinator receives a predetermined number of estimates;

means for recollecting estimates if the coordinator adds one more new processes while collecting estimates;

means for choosing the estimate from the responding processes with the largest time stamp;

means for broadcasting from the coordinator a new estimate to all processes;

means for changing the estimate of each participant to the new estimate received from the coordinator;

at each participant means for sending an acknowledgment signal to the coordinator upon the receipt of the new estimate;

means at the coordinator for terminating of acknowledgements from processes after the receipts exceed a certain threshold;

means at the coordinator for repeating the request for acknowledgements when the coordinator adds one or more processes to its recovery list during reception of the acknowledgements from the processes;

broadcasting the current coordinator's estimate as the decision value.

16. The multi-process computer system of claim 15 further comprising means for generating and sending a heartbeat signal representative of the vitality of each process;

means for generating an epoch number signal corresponding to the number of times each process recovers from a failure; and means for including the epoch number signal for each process in its corresponding heartbeat signals.

17. The multi-process computer system of claim 15 further comprising means for abandoning the current coordinator process if the epoch number of the current coordinator process increases.

18. The multi-process computer system of claim 15 further comprising means for periodically retransmitting its last message to the other processes.

19. The multi-process computer system of claim 15 further comprising means for locking the decision value in each recovered when the number of acknowledgements received by the coordinator is $(\max(n_b+1, n-n_b-|R_p|))$.

20. The multi-process computer system of claim 15 further comprising means for interrupting and terminating the consensus round if the process detects an increase in the epoch number of the coordinator, a recovery signal issued by the coordinator, or receives a message from a subsequent consensus round.

21. A failure detector for a computer network comprising:

a means for listing all the processors that are currently operational;

a means for generating an epoch number for each processor on the list;

a means for keeping all processors that are down off the list;

a means for increasing an epoch number if a processor is unstable or crashes permanently;

a means for augmenting the output of the failure detectors of the computer network with the epoch numbers.

22. An apparatus for solving consensus in a distributed system where processes may crash and later recover comprising:

means for conducting one or more consensus rounds where each round has a designated coordinator for imposing a common decision value on processes participating in the round;

means at each participant for monitoring a heartbeat signal of the coordinator and for terminating the consensus round if the coordinator's heartbeat signal indicates the coordinator is dead or unstable;

a lock mechanism for locking a value at each participating process when the coordinator imposes its decision value to some process.

* * * * *